US012687067B2

(12) United States Patent
Dahan

(10) Patent No.: US 12,687,067 B2
(45) Date of Patent: Jul. 21, 2026

(54) ELECTRONIC GATE

(71) Applicant: YCY Technologies LTD, Karmiel (IL)

(72) Inventor: Yehiel Dahan, Moreshet (IL)

(73) Assignee: YCY Technologies LTD, Karmiel (IL)

( * ) Notice: Subject to any disclaimer, the term of this patent is extended or adjusted under 35 U.S.C. 154(b) by 0 days.

(21) Appl. No.: 18/563,901

(22) PCT Filed: May 26, 2022

(86) PCT No.: PCT/IB2022/054965

§ 371 (c)(1),
(2) Date: Nov. 23, 2023

(87) PCT Pub. No.: WO2022/249124

PCT Pub. Date: Dec. 1, 2022

(65) Prior Publication Data

US 2024/0240521 A1 Jul. 18, 2024

Related U.S. Application Data

(60) Provisional application No. 63/193,094, filed on May 26, 2021.

(51) Int. Cl.
*E06B 11/02* (2006.01)
*E06B 11/08* (2006.01)

(52) U.S. Cl.
CPC .......... *E06B 11/025* (2013.01); *E06B 11/085* (2013.01)

(58) Field of Classification Search
CPC .... E06B 11/025; E06B 11/023; E06B 11/085; E05G 5/003
See application file for complete search history.

(56) References Cited

U.S. PATENT DOCUMENTS 1,523,147 A * 1/1925 Cleve .................... E05D 15/583 49/200
1,613,364 A * 1/1927 Thompson ................. B60J 3/02 160/134

(Continued)

FOREIGN PATENT DOCUMENTS

DE 202014007265 U1 10/2014
EP 2900892 8/2015

(Continued)

OTHER PUBLICATIONS

FR-2855209-A1—machine translation.*

*Primary Examiner* — Marcus Menezes
(74) *Attorney, Agent, or Firm* — Michael J. Feigin, Esq.; Feigin and Fridman, LLC

(57) ABSTRACT

An electric gate system adapted to close an open space. The electric gate system includes a support disposed at an edge of the open space, and a first plurality of gate segments. Each of the first plurality of gate segments has a closed operative orientation and an open operative orientation, where the closed operative orientation and the open operative orientation are in a single plane and are rotationally offset from one another. A gate opening assembly is attached to the support. At least one electric motor is functionally associated with each of a second plurality of gate segments, the second plurality of gate segments being a subset of the first plurality of gate segments. During operation thereof, the at least one electric motor causes simultaneous rotational motion of all gate segments in the second plurality of gate segments.

12 Claims, 20 Drawing Sheets

(56) References Cited

U.S. PATENT DOCUMENTS

| | | | | |
|---|---|---|---|---|
| 3,785,089 | A * | 1/1974 | Smith | E05F 15/627 49/358 |
| 8,020,603 | B2 * | 9/2011 | Burgin | E06B 11/085 160/134 |
| 11,939,807 | B2 * | 3/2024 | Anderson | E06B 11/025 |

FOREIGN PATENT DOCUMENTS

| | | | | |
|---|---|---|---|---|
| FR | 2855209 | A1 * | 11/2004 | E06B 11/02 |
| FR | 2855208 | | 4/2008 | |
| WO | 2011/026488 | | 3/2011 | |
| WO | WO-2011026488 | A1 * | 3/2011 | E06B 11/023 |

* cited by examiner

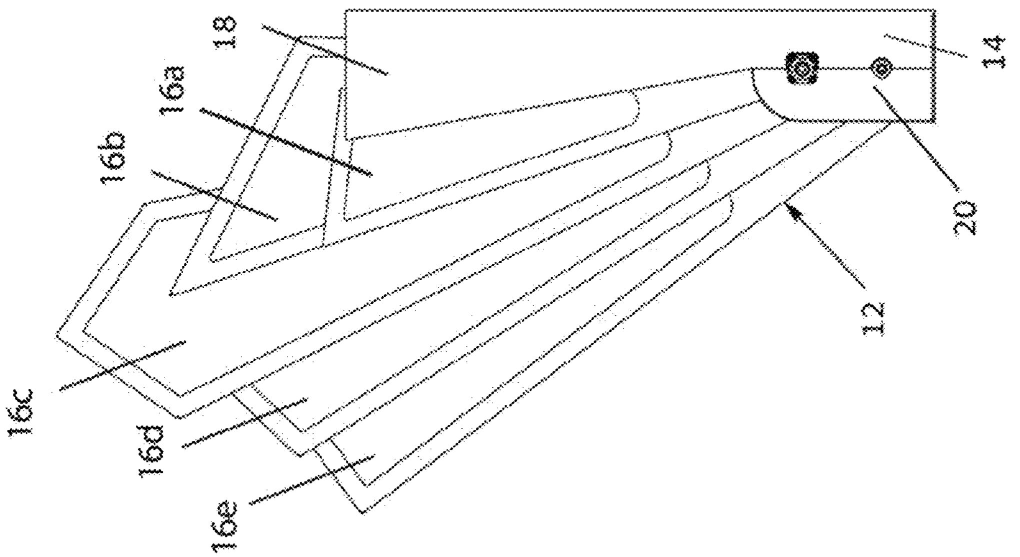
10
FIG. 1C
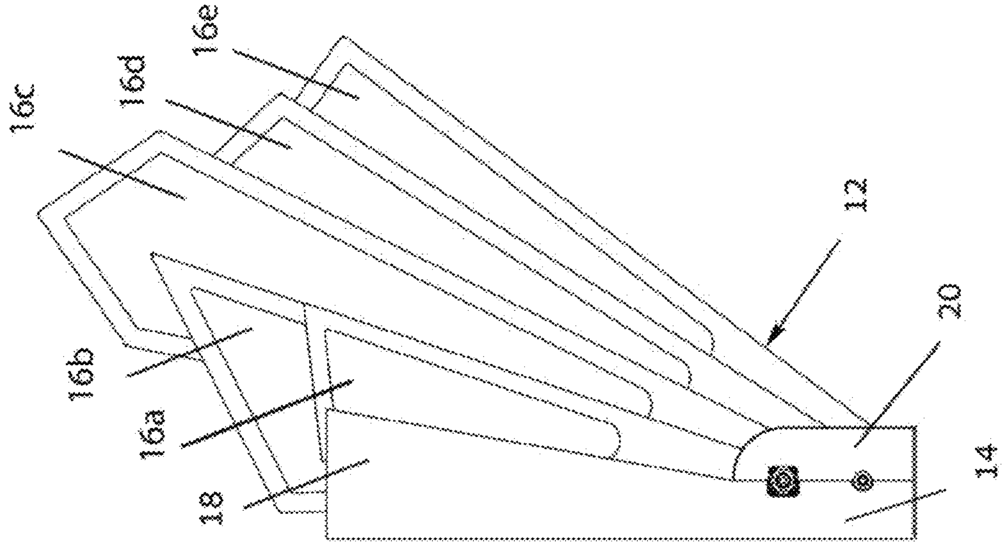

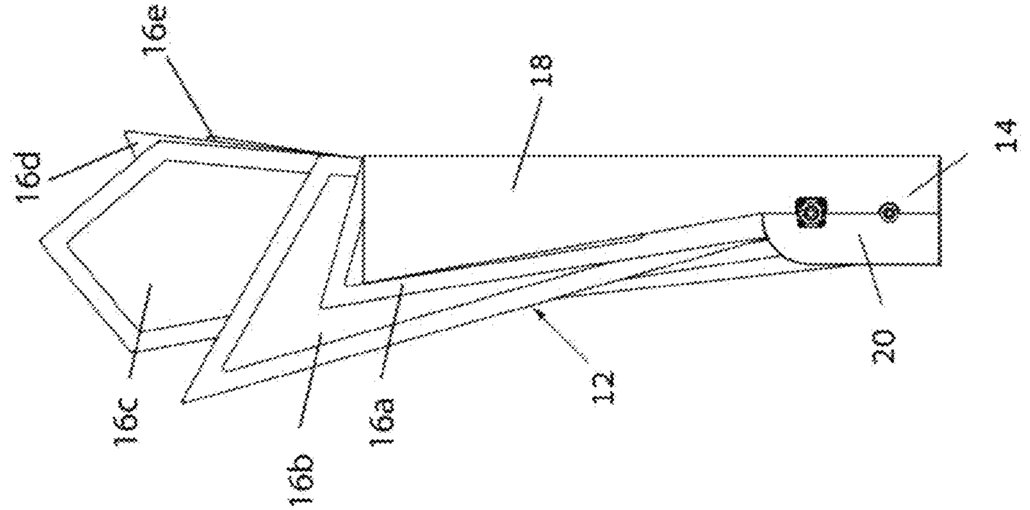
FIG. 1D
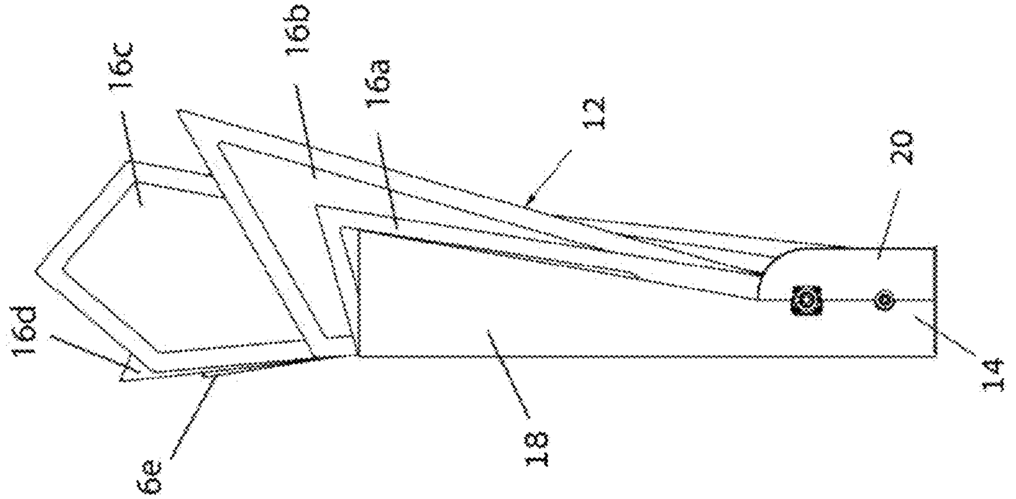

ELECTRONIC GATE

FIELD OF THE INVENTION

The present invention relates to electronic gates, and specifically to electronic gates that include segments opening parallel to one another, similar to a fan, and to methods of manufacture and use thereof.

BACKGROUND OF THE INVENTION

Typical electronic gates include a one or more gate surfaces that open in one of two ways.

In some gates, the gate surface(s) pivot about an axis, to move from an orientation in which the passageway is blocked by the gate, to an orientation that the gate lies alongside an edge of the passageway, and the passageway is open. Such gates are problematic because they require sufficient space for the gate surface to pivot from the closed position to the open position, when a vehicle is trying to pass through the gate. As such, a gate that swings inward is unsuitable for use in a short driveway or entryway, where the breadth of the swinging gate would leave insufficient room for vehicles, or where there would be a risk of the swinging of the gate damaging the vehicle. Additionally, a gate that swings outwardly may obstruct the side-walk and possibly hurt pedestrians. Furthermore, in sloped passageways or driveways, a swinging gate would only be able to swing in one direction, toward the lower part of the slope, and would be blocked by the higher part of the slope.

The other type of common gate is a sliding gate, which is in a specific orientation when closed, and slides along a track, in the same orientation, to open the gate. Sliding gates require space, alongside the driveway, for the entirety of the gate to slide into. Such space is often not available in many homes and private properties. Furthermore, the opening time of a sliding gate is relatively long, and is often frustrating to users.

In some homes and properties, entryways are blocked by a rotatable barrier, typically in the form of a bar which is mounted on a support and is raised by a motor. Such rotatable barriers are advantageous over gates because they are compact and can open rapidly. However, such barriers are only suitable for blocking entrance of vehicles, and do not provide privacy, or block out unwanted pedestrians and/or animals.

In the prior art, people have attempted to remedy the deficiencies of prior gates and systems by creating a gate that opens by pivoting upwardly, in the same plane in which it is disposed when it is closed, in a similar manner to that in which a fan opens and closes. Examples of such prior art references include U.S. Pat. No. 8,020,603 and EP Patent Number 2900892, both of which are incorporated by reference as if fully set forth herein.

However, prior art fan-shaped solutions also have several problems and deficiencies.

In some prior art systems, all the segments, or wings, of the fan, are moved by a single hinge. If the segments were all connected to the motor they would each move 90 degrees, which is undesirable. As such, in prior art systems, only the lowest segment is motorized, and the other wings are collected by the lowest wing as it rotates and "ride" on the lowest wing. This creates a very high moment—the wings are heavy, and in order to move all the wings on the lowest wing, a lot of force is required, and the connection of the lowest wing must be sufficiently robust to carry the weight of all the wings. Additionally, the opening of the gate is slow, gravity dependent, and is unstable. Furthermore, any segment not connected to the motor can be manually raised, resulting in a less secure structure.

One solution in order to reduce the required force, is to try and form light weight wings, or wings having delicate frames. However, this would cause the gate to be delicate and easily damaged by common winds. It would also make the gate dysfunctional as a blocker, since a vehicle would easily ram through the gate.

Another solution, is to use a counterweight to assist in raising the wings of the gate. However, use of such a counterweight takes up a lot of space and requires maintenance. Particularly when the driveway is narrow, it is desirable for the gate to open as fully as possible, and not to waste space of the opening using counterweights or increasing the dimensions of the mechanism of the gate. Additionally, the counterweight eases the ability of an intruder to manually force open the gate.

It is a known problem that in fan-shaped gates, when not using a counterweight or lightweight wings, a very high moment is required for opening the gate. This causes two problems.

The first is a security issue. In typical electrical gate systems, such as swinging or sliding gates, a fluctuation in the current on the motor can be detected and is indicative of the gate engaging an obstruction, which causes the motor to stop moving the gate, or to reverse the direction of motion. However, in fan-shaped gates, because of the extreme force required to move the wings of the gate, a reduction drive gear would be used, and if a wing of the gate gets stuck on something, or engages an obstruction, the fluctuation to the current on the motor would be negligible, and would not be detectable. As a result, there would be no indication for the motor would not stop operation of the gate. In other words, it is impossible to use current surges on the motor to detect an interference with movement of the gate, which could be an extreme safety hazard, for example for a person walking under the gate when the gate begins closing.

The second problem relates to manual mechanisms for opening the gate. The high moment required for opening the gate means that one cannot directly manually move the gate, because extreme force is required for that purpose. This is a direct result of reducing revolutions of a motor, moving the gate, by a mechanical gear. On the other hand, if one were to attach an auxiliary, manual, input shaft into the mechanical gear, because of the high reduction needed, one would need many turns to move the gate just a bit, and to open the gate.

There is thus a need in the art for an electronic gate which opens by rotating upward in the plane of the gate, similarly to a fan, and which overcomes the deficiencies described herein.

SUMMARY OF THE INVENTION

The present invention relates to electronic gates that include segments opening parallel to one another, similar to a fan, which is operated by multiple gear systems which are manually openable and include a safety mechanism, and to methods of use thereof.

In the context of the present application, the term "gate" relates to any partition that closes or divides an open space or portal. For example, the term "gate" as used herein may include gates, doors, cabinet doors, window shutters, area partitions separating a room or other area into smaller areas, blocking or allowing passage in or view from a portal, or enclosing, and blocking access to, structures or equipment.

In accordance with an embodiment of the present invention, there is provided an electric gate system adapted to close an open space. The electric gate system includes a support disposed at an edge of the open space, and a first plurality of gate segments.

Each of the first plurality of gate segments has a closed operative orientation and an open operative orientation, where the closed operative orientation and the open operative orientation are in a single plane and are rotationally offset from one another. The electric gate system further includes a gate opening assembly, attached to the support. The gate opening assembly includes at least one electric motor functionally associated with each of a second plurality of gate segments, the second plurality of gate segments being a subset of the first plurality of gate segments. During operation thereof, the at least one electric motor causes simultaneous rotational motion of all gate segments in the second plurality of gate segments.

In some embodiments, in the closed operative orientation the gate segments in the first plurality of gate segments, together, cover the open space. In some such embodiments, in the open operative orientation, at least a portion of each of the gate segments in the first plurality of gate segments are disposed one in front of the other in parallel planes.

In some embodiments, the support, together with an opposing border, define an open area, and the open space includes an entirety of the open area. In some other embodiments, the open space includes a portion of the open area.

In some embodiments, at least one gate segment in the first plurality is not included in the second plurality. In some such embodiments, the at least one gate segment of the first plurality of gate segments which are not included in the second plurality of gate segments are moved from the closed operative orientation to the open operative orientation passively, by riding on one or more of the gate segments in the second plurality of gate segments.

In other embodiments, the second plurality of gate segments includes all the segments in the first plurality of gate segments.

In some embodiments, each gate segment of the first plurality of gate segments forms an angular slice of the gate, extending from a base angle disposed adjacent the gate opening assembly.

In some embodiments, at least two gate segments of the first plurality of gate segments have different base angles. In other embodiments, all gate segments in the first plurality of gate segments have equal base angles.

In some embodiments, the gate opening assembly further includes a gear reducer having an input shaft connected to the at least one electric motor, and an output shaft. The gate opening assembly may further include a plurality of segment-moving subassemblies, functionally associated with the output shaft of the gear reducer. Each of the segment-moving subassemblies is functionally associated with one gate segment of the second plurality of gate segments, and is adapted to control motion of the one gate segment.

In some such embodiments, the gear reducer includes an additional input shaft connected or connectable to a manually rotatable handle.

In some embodiments, the electric gate system further includes a second gear reducer, receiving the output shaft as its input, and a second output shaft, wherein the plurality of segment moving subassemblies are connected to the second output shaft and are functionally associated with the output shaft via the second gear reducer.

In some embodiments, the second gear reducer includes a planetary gear system.

In some embodiments, each of the segment-moving subassemblies includes a first sprocket, mounted onto the output shaft or the second output shaft and rotatable therewith, and a second sprocket, mounted onto an axle disposed parallel to the output shaft or the second output shaft, and rotatable relative to the axle. A transmission chain connects the first sprocket and the second sprocket. An engagement arm is mounted onto the second sprocket and has a specific gate segment of the second plurality of gate segments mounted thereon. In this arrangement, rotation of the output shaft causes rotation of the first sprocket, which in turn drives rotation of the second sprocket, the engagement arm, and the specific gate segment.

In some embodiments, a first gate segment of the second plurality of gate segments, associated with a first segment-moving subassembly of the plurality of segment moving subassemblies, is adapted to rotate to a first angular extent when transitioning from the closed operative orientation to the open operative orientation. A second gate segment of the second plurality of gate segments, associated with a second segment-moving subassembly of the plurality of segment moving subassemblies, is adapted to rotate to a second angular extent when transitioning from the closed operative orientation to the second angular orientation, where the first angular extent is different from the second angular extent. In such embodiments, the first sprocket included in the first segment-moving subassembly has a different number of teeth or a different diameter than the first gear included in the second segment-moving subassembly.

In some such embodiments, the first angular extent is greater than the second angular extent and the first sprocket included in the first segment-moving subassembly has a greater number of teeth or a greater diameter than the first sprocket included in the second segment-moving subassembly.

In some embodiments, the electric gate system further includes a counter support disposed at a second edge of the open space. The counter support includes a plurality of support brackets. In the closed operative orientation, ends of at least some of the first plurality of gate segments, distal to the support, engage corresponding ones of the plurality of support brackets.

In some embodiments, at least some of the first plurality of gate segments have mounted thereon segment-engaging brackets. In the closed operative orientation, a segment-engaging bracket of a specific one of the first plurality of gate segments is adapted to engage another gate segment adjacent to the specific one of the plurality of the gate segments.

BRIEF DESCRIPTION OF THE FIGURES

The foregoing discussion will be understood more readily from the following detailed description of the invention, when taken in conjunction with the accompanying Figures, in which:

FIGS. 1A, 1B, 1C, and 1D are planar front view illustrations of an electric gate according to an embodiment of the present invention, at four stages during opening of the gate;

DESCRIPTION OF THE PREFERRED EMBODIMENTS

Figure 1A:
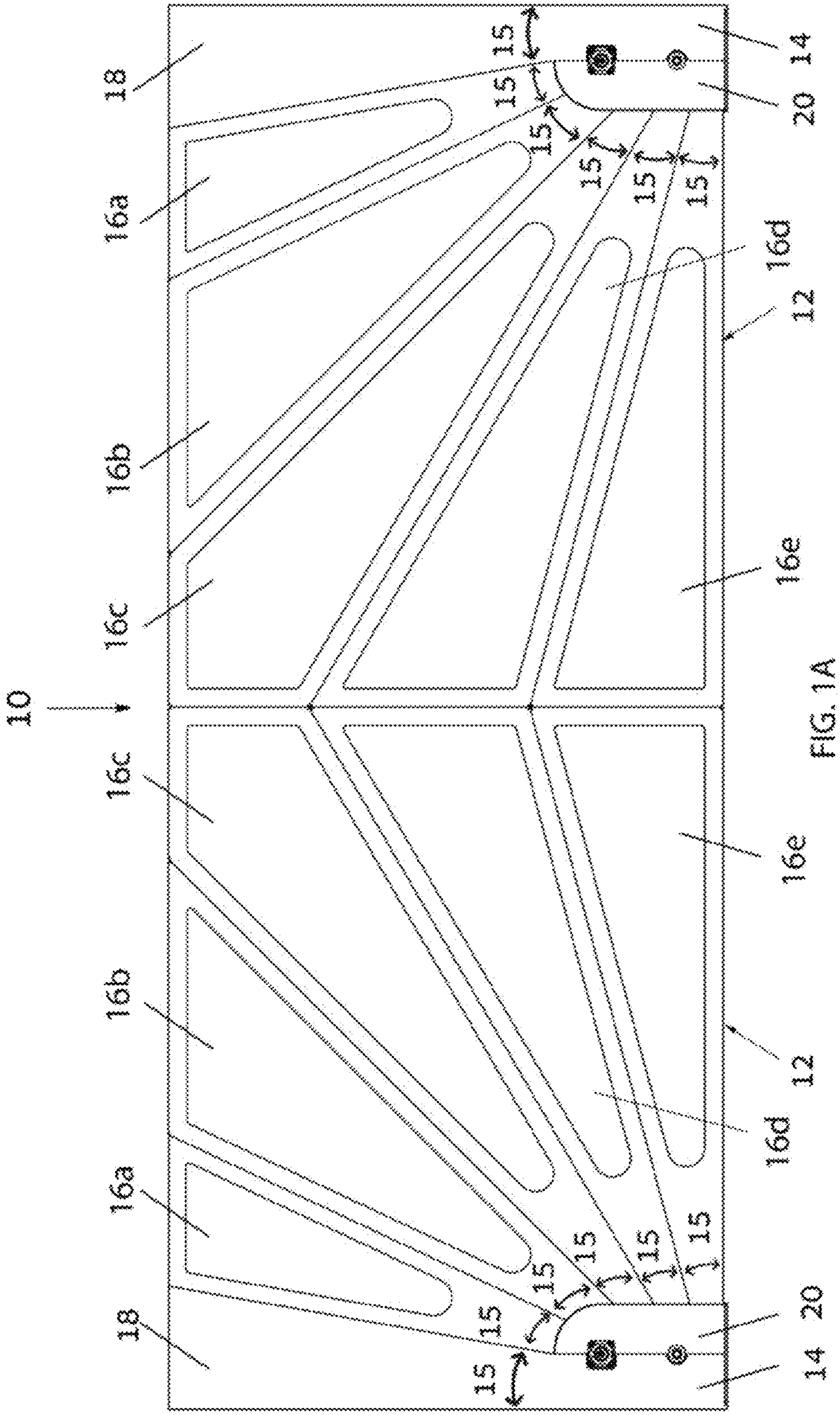

The principles of the inventive electric gate may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For the purposes of the present disclosure, the plane of the gate is a plane in which the gate lies when it is closed, which is typically perpendicular to the ground and to at least one support of the gate.

For the purposes of the present disclosure, the term "substantially" is defined as "at least 90% of" or "within 10% deviation of".

Reference is now made to FIGS. 1A, 1B, 1C, and 1D, which are planar front view illustrations of an electric gate 10 according to an embodiment of the present invention, at four stages during opening of the gate.

As seen in FIGS. 1A to 1D, gate 10 includes two portions 12, disposed alongside one another, each portion 12 being mounted on a corresponding support 14. However, in some embodiments, such as when closing a relatively narrow opening, gate 10 may include a single portion 12 mounted onto a single support 14.

As seen, each portion 12 of the gate includes a plurality of gate segments 16*a*, 16*b*, 16*c*, 16*d*, and 16*e*, disposed alongside one another. Each of the gate segments spans an angular portion of a lower bottom corner of the gate portion 12, where the gate portion is attached to support 14. In the illustrated embodiment, each of the five gate segments spans a 15 degree angle of the gate, and the support 14 includes a flap 18 spanning an additional 15 degree angle of the gate, resulting in 90 degrees required for a corner. However, the gate may have any desired number of segments, and may span any desired angular breadth (i.e., need not necessarily fill a 90 degree angle, but may fill an acute angle or obtuse angle as well).

In some embodiments, each gate portion may have a different number of segments, such that two gate portions of a single gate are not mirror images of one another.

In the illustrated embodiment, all the gate segments 16 span the same angular range, of 15 degrees. However, in some embodiments, different segments may span different angular ranges.

A gate opening assembly 20 is functionally associated with gate segments 16, as described in further detail hereinbelow with respect to FIGS. 2A to 4, and controls opening of the gate.

FIG. 1A illustrates gate 10 when it is closed. In this orientation, there is substantially no overlap between gate segments 16, such that the gate segments cover an entire rectangular area of an opening to be closed. However, it is appreciated that the area filled by the gate may be of any shape or dimension. Additionally, the area filled by the gate may be a portion of an opening—the gate need not necessarily fill the entire opening.

In some embodiments, gate segments 16 are in multiple parallel planes, where each plane segment is disposed slightly in front of, or behind, the next segment, such that when the gate is opened (as shown in FIG. 1D), the segments can be arranged in parallel planes one in front of the other. However, in the closed operative orientation, the segments appear as if they are in a single plane. In some such embodiments, the distance between a plane of front gate segment 16*a*, and a plane of back gate segment 16*e*, is substantially equal to the width or thickness of the three intervening gate segments, or any number of intervening gate segments.

Figure 1B:
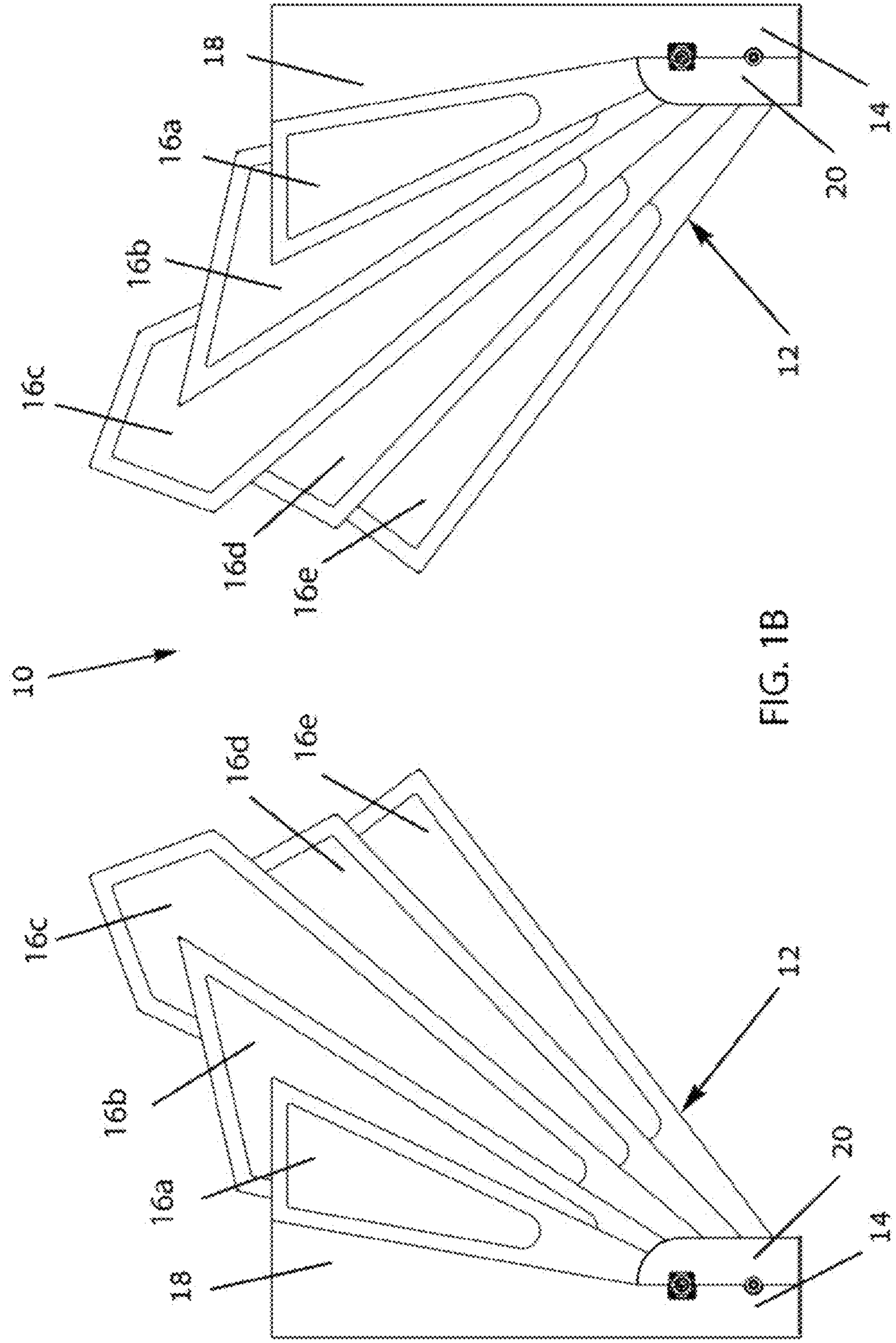

FIG. 1B illustrates a first stage during opening of gate 10. As seen in FIG. 1B, gate segments 16*b*, 16*c*, 16*d*, and 16*e* have all been rotated, or pivoted, relative to gate opening assembly 20, about a single axis. As such, a portion of each of segments 16*b*, 16*c*, 16*d*, and 16*e* is disposed behind a portion of a corresponding one of segments 16*a*, 16*b*, 16*c*, and 16*d*, respectively. However, segment 16*a* remains stationary and has not moved relative to gate opening assembly 20.

The mechanism by which gate opening assembly 20 causes segments 16*b*, 16*c*, 16*d*, and 16*e* to pivot simultaneously about the same axis is described hereinbelow with respect to FIGS. 2A to 4.

FIG. 1C illustrates a second stage during opening of gate 10. As seen in FIG. 1C, gate segments 16*b*, 16*c*, 16*d*, and 16*e* have continued to rotate, or pivot, relative to gate opening assembly 20, about a single axis. As such, a larger portion of each of segments 16*b*, 16*c*, 16*d*, and 16*e* is disposed behind a portion of a corresponding one of segments 16*a*, 16*b*, 16*c*, and 16*d* than in FIG. 1B. Additionally, segment 16*b* has engaged segment 16*a* carries segment 16*a* with it. In other words, segment 16*a* rotates or pivots by riding on segment 16*b*, because of the pivoting of segment 16*b*.

FIG. 1D shows gate 10 in an open operative orientation. As seen, in the open operative orientation, which occurs following completion of pivoting of the segments, all the segments 16*a*, 16*b*, 16*c*, 16*d*, and 16*e* are disposed in parallel planes to one another, behind flap 18 of support 14.

When closing gate 10, the states are repeated in the opposite order, with the segments being pivoted in the opposing direction to lower the segments.

Figure 1E:
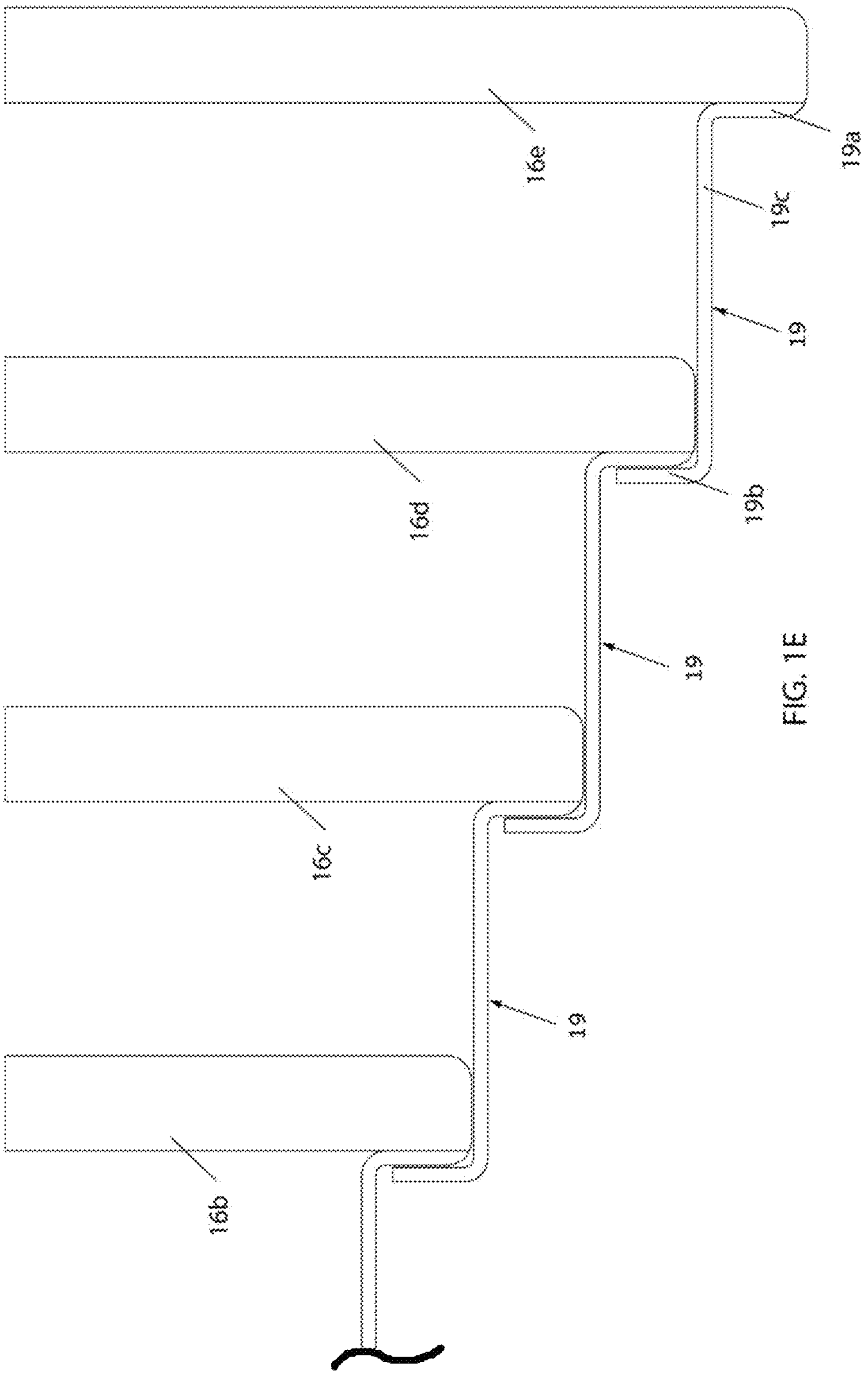
FIG. 1E is a planar side view illustration of an embodiment of the electric gate of FIGS. 1A to 1D, in an open position.

Reference is now additionally made to FIG. 1E, which is a planar side view illustration of electric gate 10 in the open operative orientation. As seen in FIG. 1E, each of the gate segments 16 has mounted at an edge thereof a bracket 19, including a first portion 19*a* connected to a specific gate segment, e.g. gate segment 16*e*, a second portion 19*b* which engages an adjacent, higher, gate segment, e.g. gate segment 16*d*, and an interim portion 19*c* disposed between the first and second portions of the bracket.

In use, brackets 19 reinforce the strength of the gate, and ensure that even if one of the gate segments is not moved by the motor, as explained in further detail hereinbelow, that gate segment may be moved together with a lower gate segment. More specifically, the stuck gate segment may be "picked up" by the lower gate segment during motion thereof, such that the motion of the lower gate segment would also cause motion of the stuck gate segment.

Figure 2A:
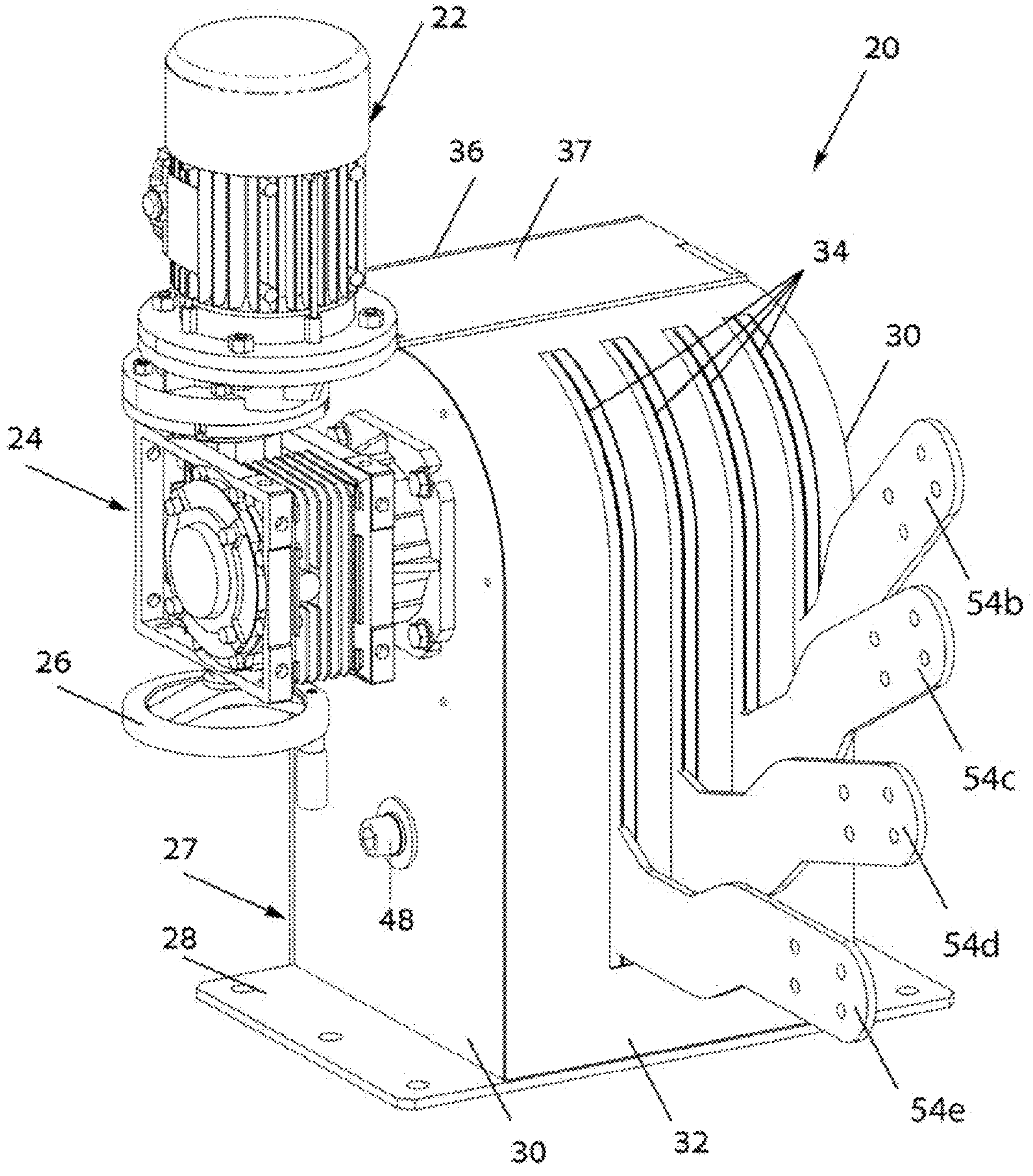
FIGS. 2A and 2B are, respectively, a perspective view illustration and a planar front view illustration of a gate opening assembly forming part of the electric gate of FIGS. 1A to 1D, according to an embodiment of the present invention.
Figure 2B:
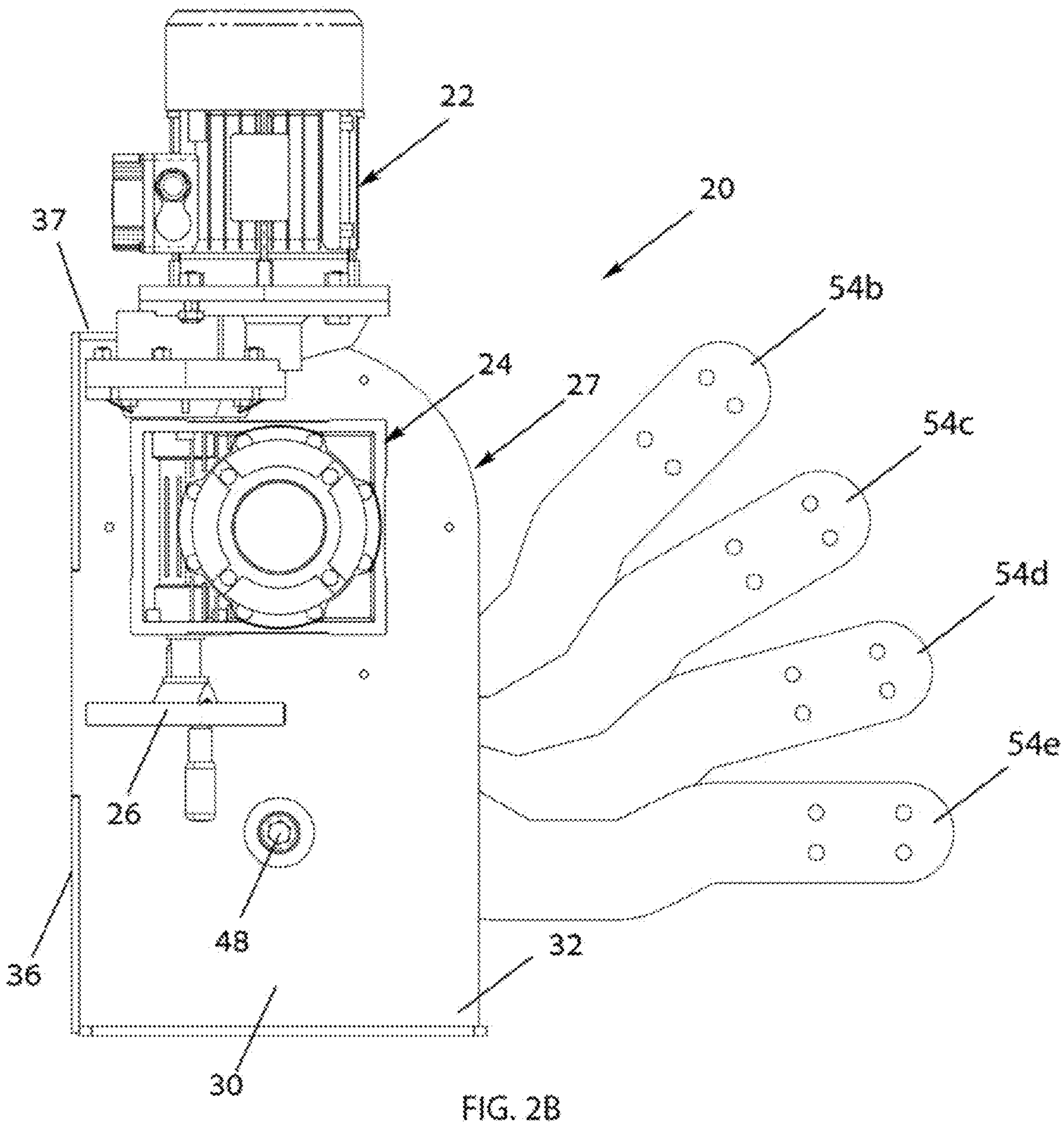
Figure 3A:
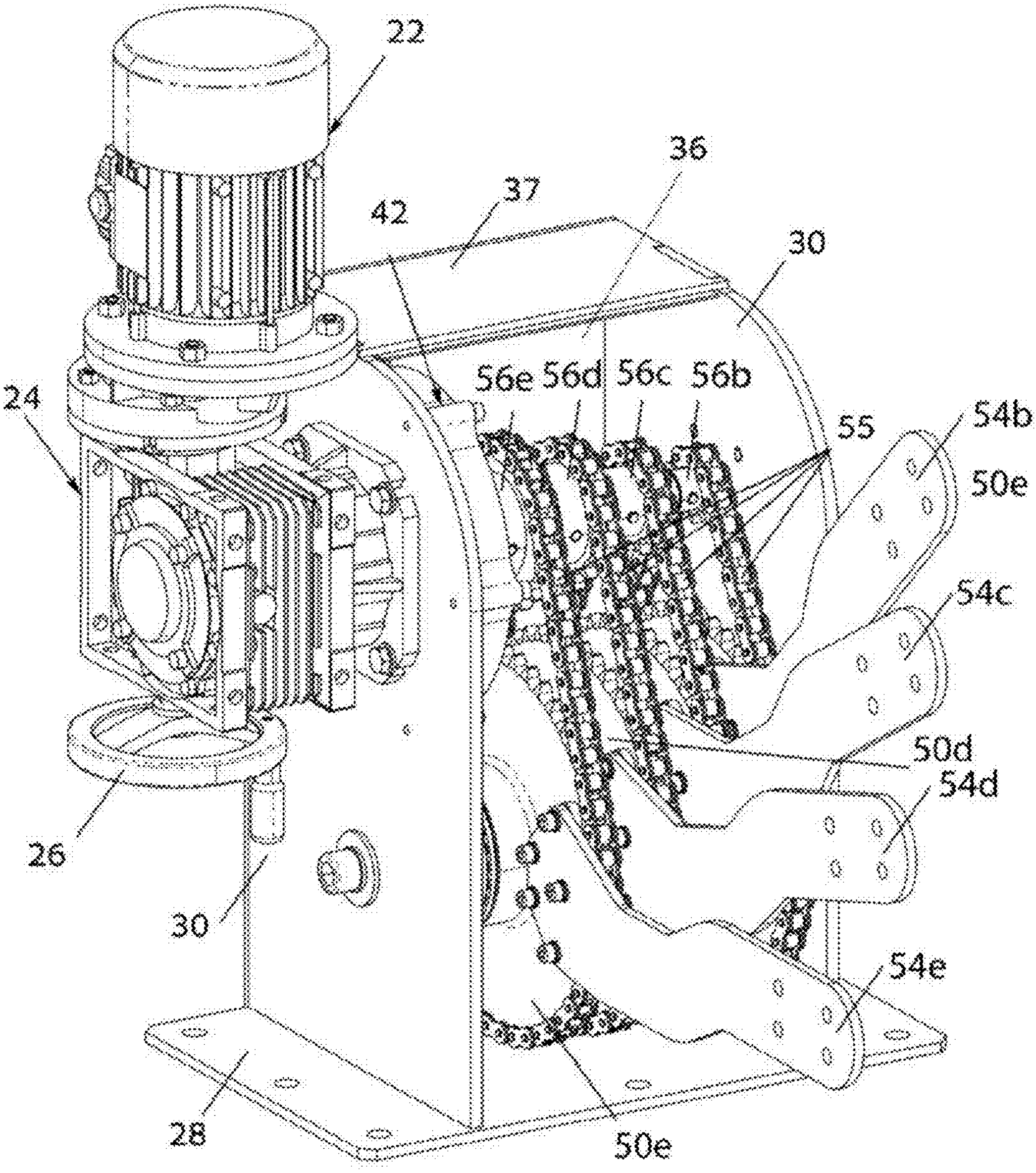
FIGS. 3A, 3B, and 3C are, respectively, first and second perspective illustrations, and a side view planar illustration, of the gate opening assembly of FIGS. 2A and 2B, having a side cover removed therefrom to show an internal mechanism.
Figure 3B:
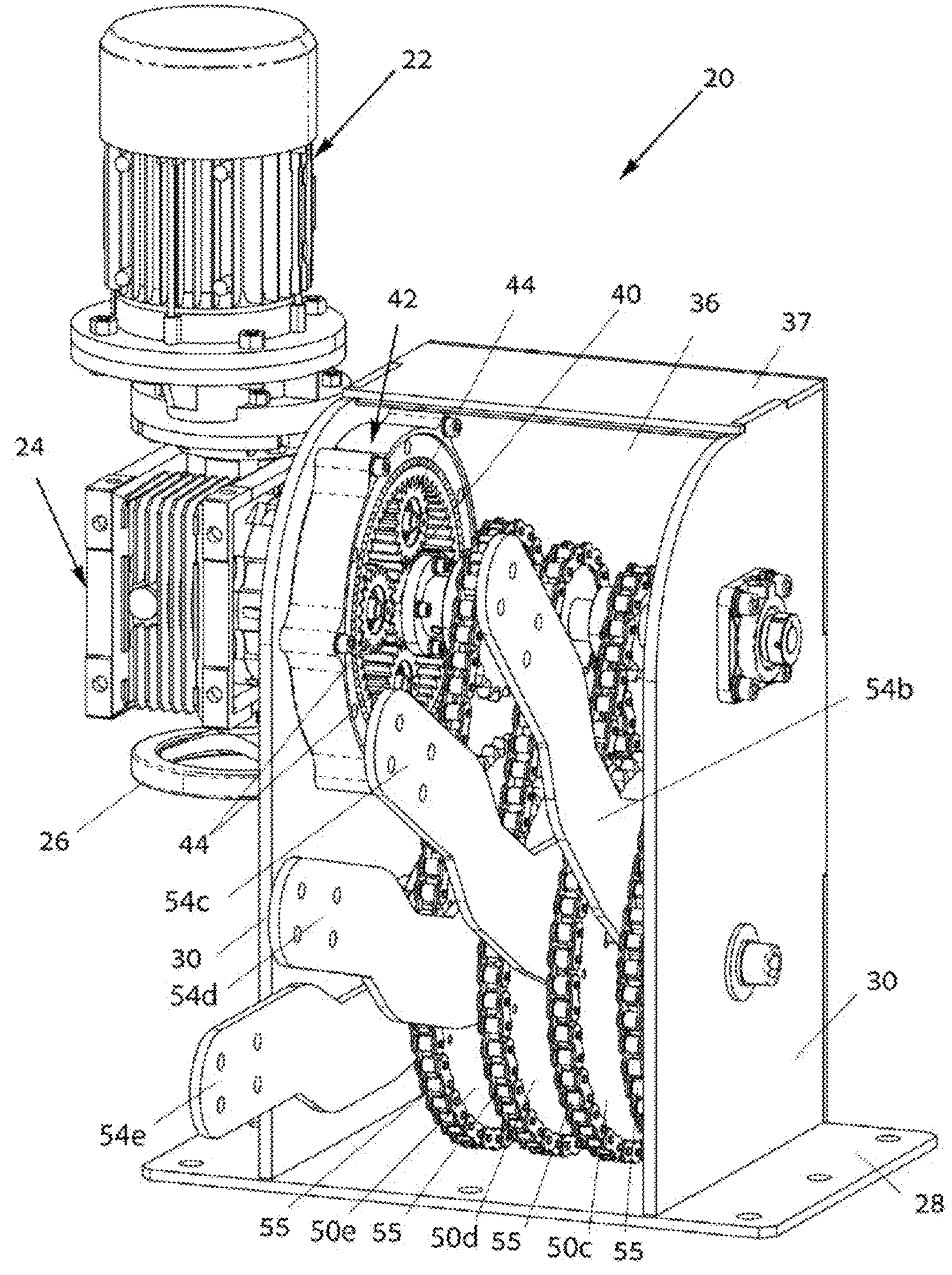
Figure 3C:
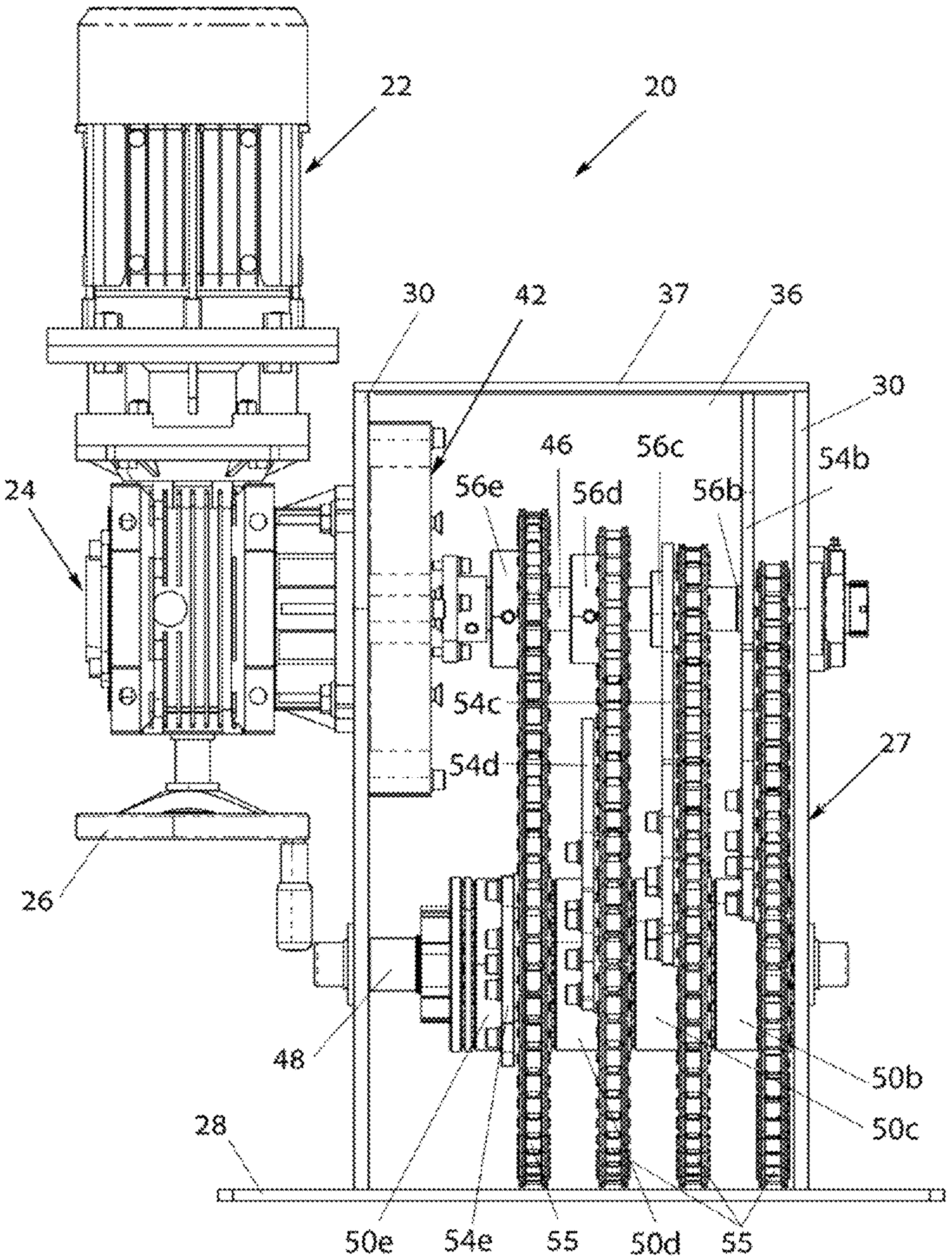
Figure 4:
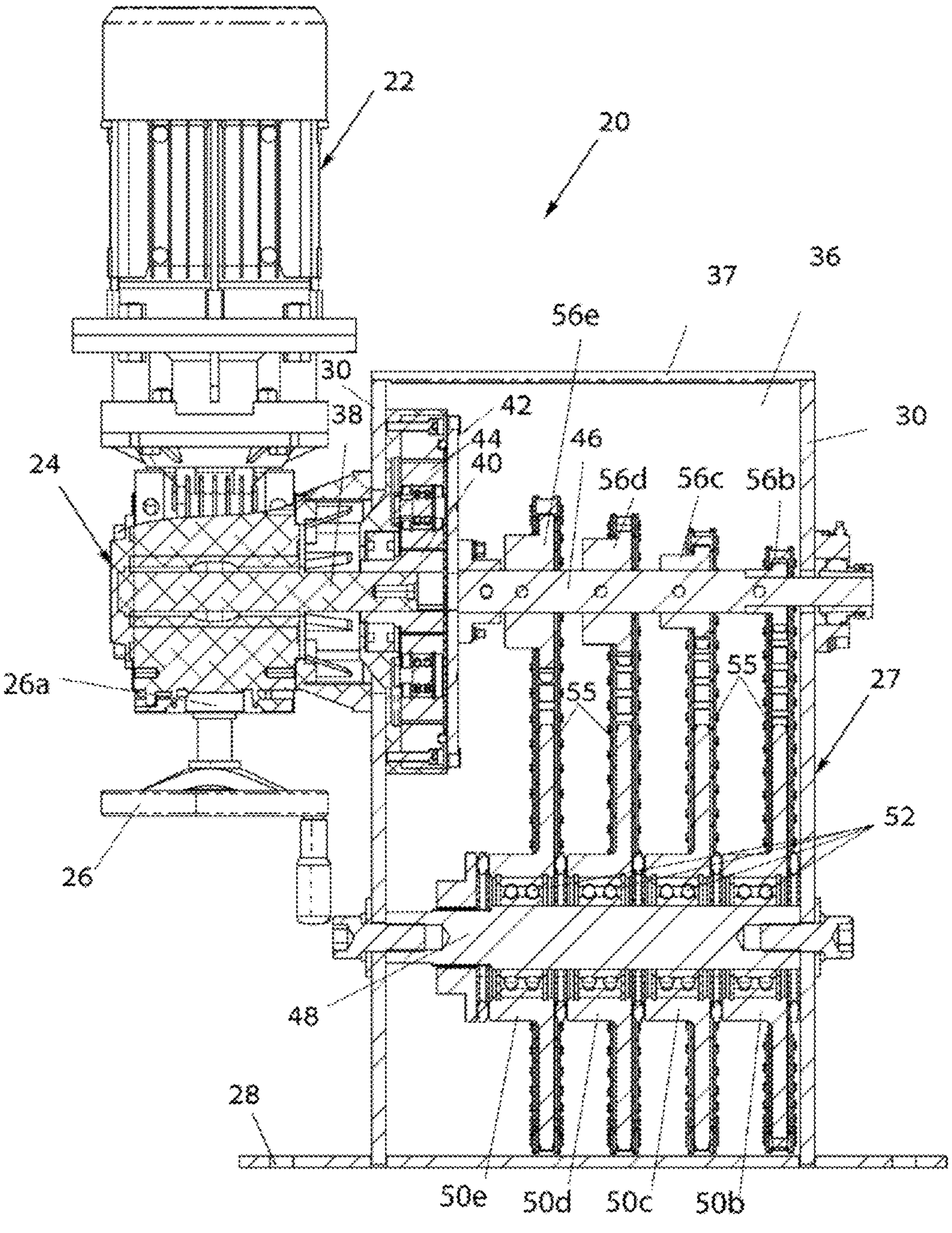
FIG. 4 is a sectional illustration of the gate opening assembly of FIGS. 2A to 3C.

Reference is now made to FIGS. 2A and 2B, which are, respectively, a perspective view illustration and a planar front view illustration of gate opening assembly 20 forming part of the electric gate 10, according to an embodiment of the present invention. Reference is additionally made to FIGS. 3A, 3B, and 3C, which are, respectively, first and second perspective illustrations, and a side view planar illustration, of gate opening assembly 20 having a side cover removed therefrom to show an internal mechanism, and to FIG. 4, is a sectional illustration of gate opening assembly 20.

As seen, gate opening assembly 20 includes an electric motor 22 connected to a gear reducer, for example an NMRV gearbox 24. An additional, manually rotatable, handle 26, connected to a secondary input shaft 26*a* of NMRV gearbox 24, may provide input to the gearbox.

An assembly housing 27, which includes a base 28, front and back surfaces 30, one of which has gearbox 24 mounted thereon, an operational side surface 32 including a plurality of slots 34, a second side surface 36, and a top surface 37. In some embodiments, operational side surface 32 may be curved, as shown in FIG. 2A. However, the illustrated embodiment is an example of a structure of the assembly housing, and other structures are considered within the scope of the present invention.

An output shaft 38 of gearbox 24 extends into a second gear reducer, which, in the illustrated embodiment, is a sun gear 40 of a planetary gear system 42, including sun gear 40 surrounded by a plurality of planet gears 44. An output shaft 46 of planetary gear system 42 rotatably extends between front and back surfaces 30 of assembly housing 27. A second shaft 48 extends between front and back surfaces 30 of assembly housing 27, and is fixed relative thereto. Typically, second shaft 48 is disposed lower than, and typically parallel to, output shaft 46 of planetary gear system 42.

It is a particular feature of the present invention that, in use, the reduction of the rotation of electric motor 22 is split between the NMRV gearbox 24 and the planetary gear system 42. As a result, the pressure caused by the extreme reduction of rotation required is split between the two systems. Additionally, in the planetary gear system, the pressure is split between multiple engagement surface of the sun gear 40 and planet gears 44, thus resulting in a more robust and durable system, particularly because gates of the present invention are typically disposed outdoors, and are exposed to external pressures, such as wind and mechanical or structural damage to the gate, as well as internal pressures.

It is to be appreciated that gate opening assembly may include more than two gear reducers, connected in series.

As seen clearly in FIGS. 3C and 4, mounted onto second shaft 48 are a plurality of sprockets 50*b*, 50*c*, 50*d*, and 50*e*, which are rotatable relative to second shaft 48. Sprockets 50 may be substantially equally sized, and may have the same number of teeth. In some embodiments, bearings 52 may be disposed between each sprocket 50 and second shaft 48. Each of sprockets 50*b*, 50*c*, 50*d*, and 50*e* has mounted thereon a corresponding engagement arm, or lever, 54*b*, 54*c*, 54*d*, and 54*e*. Each of the engagement arms extends through a corresponding one of slots 34, as seen clearly in FIGS. 2A and 2B, and is adapted to have mounted thereon a corresponding one of gate segments 16*b*, 16*c*, 16*d*, and 16*e*.

Another plurality of sprockets, including sprockets 56*b*, 56*c*, 56*d*, and 56*e* are mounted onto output shaft 46 of planetary gear system 42, and are rotatable therewith. Sprockets 56*b*, 56*c*, 56*d*, and 56*e* each have a different diameter and a correspondingly different number of teeth. Each of sprockets 56*b*, 56*c*, 56*d*, and 56*e*, is associated with a corresponding one of sprockets 50*b*, 50*c*, 50*d*, and 50*e*, by a transmission chain 55, similar to a bicycle chain.

Each set of sprocket 56, corresponding sprocket 50, transmission chain 55, and arm 54 mounted on the corresponding sprocket, is termed herein segment-moving subassembly for opening and closing the corresponding gate segment 16 mounted onto the arm 54.

In use, when motor 22 is operated, for example by a remote control, rotation of the motor is reduced by gear reducer 24 and by planetary gear system 42, such that output shaft 46 of the planetary gear system rotates slowly. Sprockets 56*b*, 56*c*, 56*d*, and 56*e* all rotate together with output shaft 46, and to the same degree (e.g., if output shaft rotates one full rotation, each of sprockets 56*b*, 56*c*, 56*d*, and 56*e* also rotates one full rotation). However, because of the difference in the number of teeth of sprockets 56*b*, 56*c*, 56*d*, and 56*e*, the rotation of each of the sprockets causes different lengths of rotation of sprockets 50*b*, 50*c*, 50*d*, and 50*e*, respectively. For example, sprocket 50*e*, which is connected to sprocket 56*e* which has the largest number of teeth, will rotate to a greater extent than sprocket 50*b*, which is connected to sprocket 56*b* with the smallest number of teeth. Specifically, each of sprockets 50*b*, 50*c*, 50*d*, and 50*e* will rotate to a different extent, with the rotations all being simultaneous and based on the rotation of output shaft 46.

The simultaneous differential rotation of sprockets 50*b*, 50*c*, 50*d*, and 50*e* results in simultaneous differential rotation of the arms 54*b*, 54*c*, 54*d*, and 54*e*, and in corresponding simultaneous differential rotation of gate segments 16*b*, 16*c*, 16*d*, and 16*e*. The reduction of the rotation of motor 22, as well as the number of teeth of each of sprockets 56 and of sprockets 50 are computed based on the angular distance each of the gate segments 16 must traverse in order to fully open the gate.

It is to be appreciated that the use of sprockets 50 and 56, together with transmission chain 55, which engages the sprockets throughout the chain, ensures that there is sufficient force resisting manually moving the segment-moving subassembly and manually raising the corresponding segment.

It is to be appreciated that, though the description herein relates to a transmission system including sprockets and a transmission chain, any suitable transmission system is considered within the scope of the present invention. For example, the sprockets and chain transmission may be replaced by a transmission system including pulleys and a timing belt, a transmission system including a plurality of cogs, or any other suitable transmission system.

As discussed hereinabove with respect to FIGS. 1A to 1E, in the illustrated embodiment, gate segment 16*a* is not actively moved by operation of motor 22, but rather is moved passively by "riding on" gate segment 16*b* when that gate segment opens. As such, the gate opening assembly 20 does not include a segment-opening subassembly for engagement with, and for moving of, gate segment 16*a*.

In some embodiments, each of the gate segments may be actively moved by the motor 22. In such embodiment, gate opening assembly 20 would include a segment-opening subassembly associated with each of the gate segments.

In some embodiments, more than one gate segment may be passively moved by another gate segment. In such embodiment, gate opening assembly 20 would include a segment-opening subassembly only for segments that are actively moved. However, it is a particular feature of the present invention that at least two of the gate segments are actively moved by motor 22.

As discussed hereinabove, manually rotatable, handle 26 is connected to secondary input shaft 26*a* of NMRV gearbox 24, such that planetary gear system 42 is downstream of handle 26. As a result, the gear reduction provided by planetary gear system 42 is used also when operating the gate manually by rotating handle 26, making it possible to open the gate with a far smaller number of rotations than when the gear reduction is all carried out by NMRV gearbox 24.

In some embodiments, gate 10 may further include a safety assembly, adapted to stop operation of motor 22 when any of gate segments 16 is stuck or engages another object. In some embodiments, a two-layer safety system may be used. In some such embodiments, a first layer of the safety system may include a safety mechanism based on short circuiting of an electrical circuit disposed within a touch sensitive pad or bar, which would typically be mounted onto a bottom, lengthwise surface of the lowest segments of the gate (for example segments 16*e* in FIG. 1A). The second layer of the safety system may include an optical safety mechanism, such as an optical sensor sensing the presence of an obstruction in the area of the gate, for example as is known in elevators and other prior art automated doors and gates.

Figure 5A:
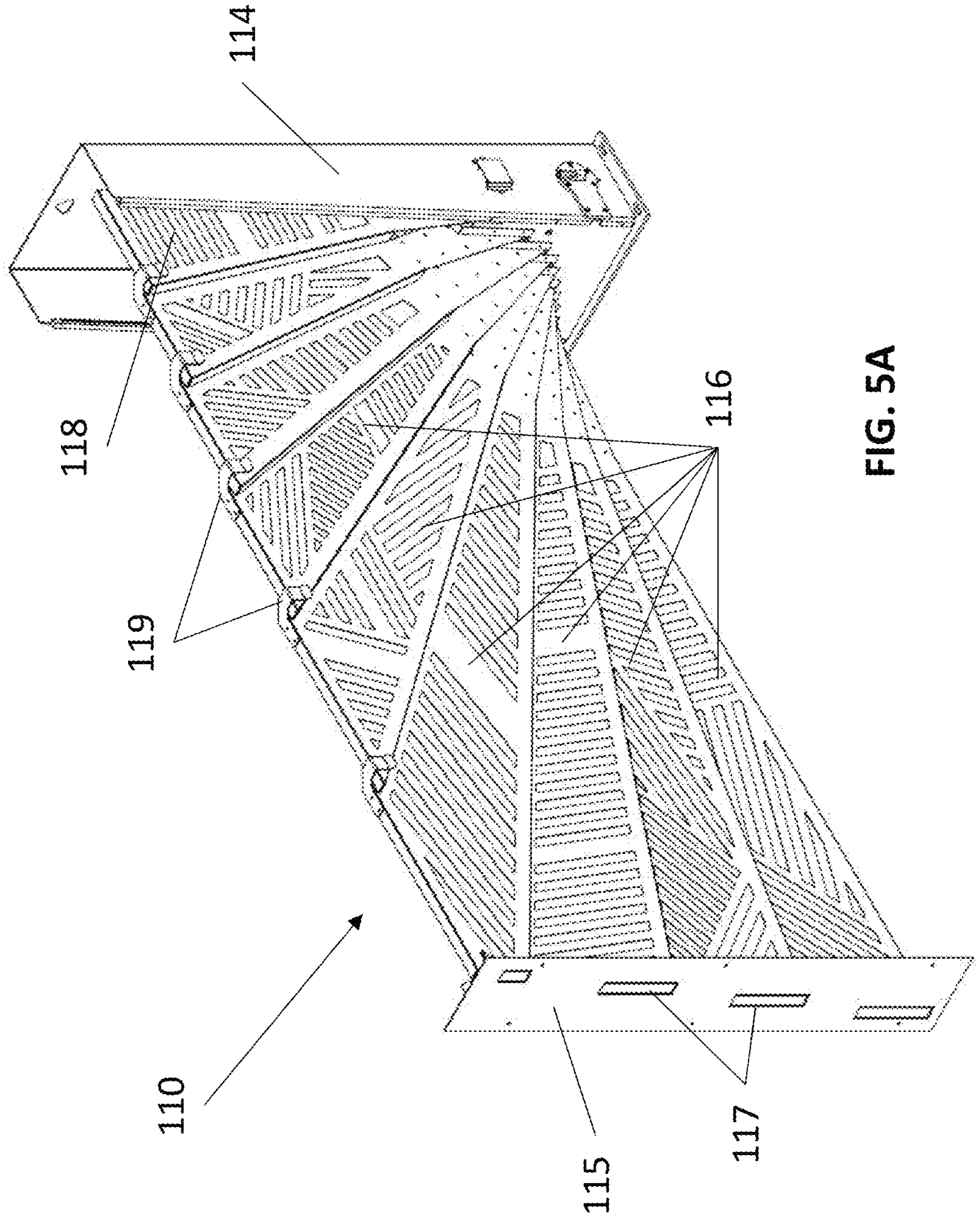
FIGS. 5A, 5B, and 5C are, respectively, a perspective view illustration and two planar front view illustrations of an electric gate according to another embodiment of the present invention, the planar front views being when the gate is closed and when the gate is partially open.
Figure 5B:
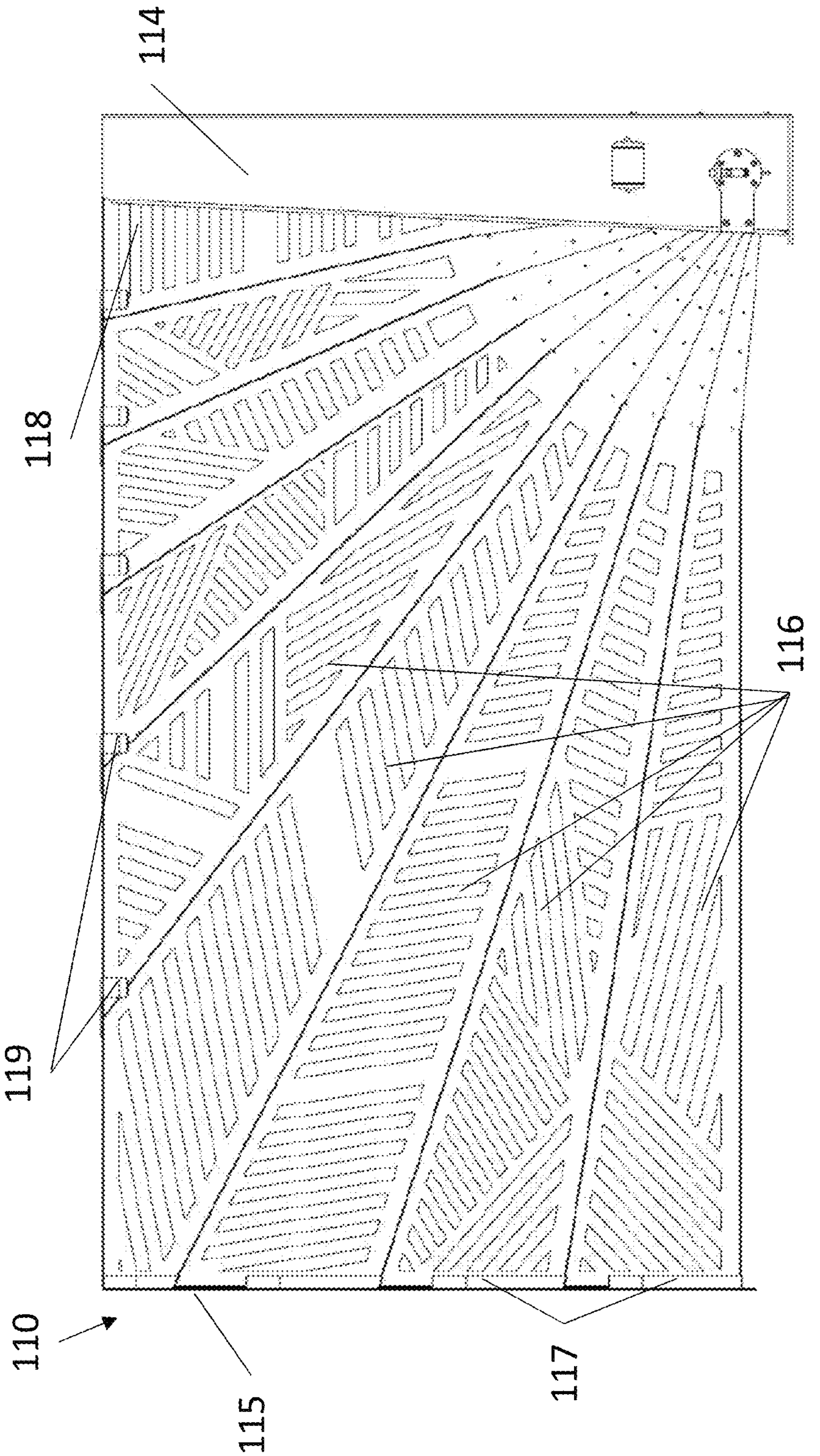
Figure 5C:
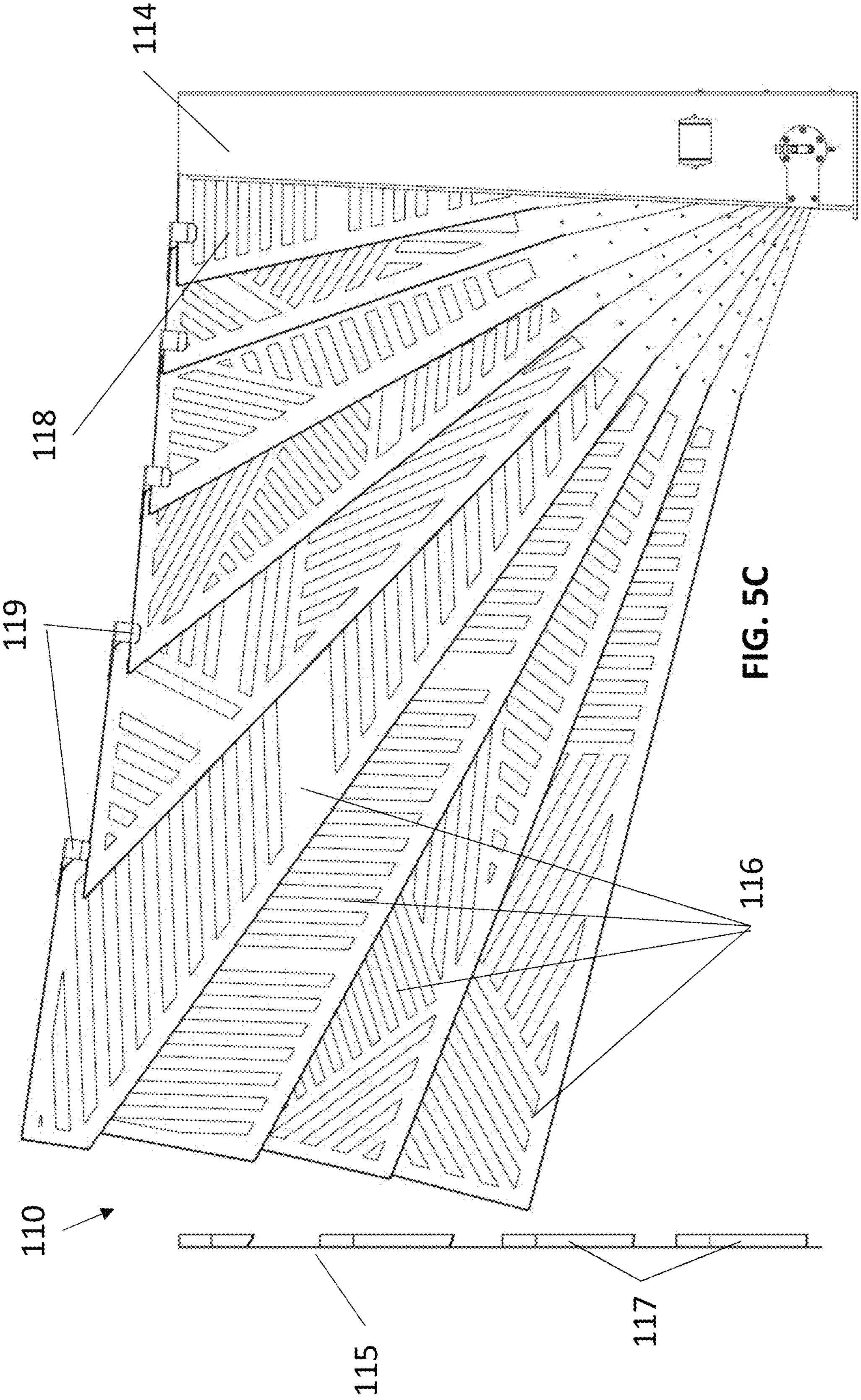

Reference is now made to FIGS. 5A, 5B, and 5C, which are, respectively, a perspective view illustration and two planar front view illustrations of an electric gate 110 according to another embodiment of the present invention, the planar front views being when the gate is closed and when the gate is partially open.

Gate 110 is substantially similar to gate 10 described hereinabove, with like numbers representing like components. Specifically, the operation of gate 110 is substantially the same as the operation of gate 10, as described hereinabove. One distinction between gate 110 and gate 10 is in the number of gate segments, where gate 110 includes more gate segments than gate 10. The number of gate segments also impacts the internal mechanism of the gate, as explained hereinbelow. Another distinction is that gate 110 extends from a single side of the opening, and not from two opposing sides of the opening.

As seen in FIGS. 5A to 5C, gate 110 includes a single portion mounted on a support 114 and extending to a counter support 115. Gate 110 includes a plurality of gate segments 116, disposed alongside one another, here shown as eight segments. Each of the gate segments spans an angular portion of a lower bottom corner of gate 110, where the gate is attached to support 114. In the illustrated embodiment, each of the eight gate segments spans a 10 degree angle of the gate, and the support 114 includes a flap 118 spanning an additional 10 degree angle of the gate, resulting in 90 degrees required for a corner. However, the gate may have any desired number of segments, each spanning a desired angular range, as discussed hereinabove.

A gate opening assembly 120 is functionally associated with gate segments 116, as described in further detail hereinbelow with respect to FIGS. 6A to 7C, and controls opening of the gate.

FIGS. 5A and 5B illustrate gate 110 when it is closed. In this orientation, there is substantially no overlap between gate segments 116, such that the gate segments cover an entire area of the opening to be closed. As discussed hereinabove, gate segments 116 may be in multiple parallel planes, such that when the gate is opened (as shown in FIG. 5C), the segments can be arranged in parallel planes one in front of the other. However, in the closed operative orientation, the segments appear as if they are in a single plane. In some such embodiments, the distance between a plane of the frontmost segment and a plane of the backmost segment is substantially equal to the width or thickness of the intervening gate segments.

As seen, in the closed orientation of gate 110, segments 116 which engage counter support 115, may be disposed within brackets or anchors 117, mounted onto the counter support.

Additionally, each of gate segments 116 that do not engage counter support 115 has mounted at an upper edge thereof a bracket 119, including a first portion connected to a specific gate segment, and a second portion adapted to hook onto an adjacent, higher, gate segment. When gate 110 is closed, each bracket 119 engages the previous segment. As shown in FIG. 5C, when the gate is opened, the bracket detaches from the previous segment and allows each segment to be raised separately.

In use, brackets 117 and 119 reinforce the strength of the gate, particularly in windy conditions.

Turning to FIG. 5C, it is seen that the segments of gate 110 are all opened simultaneously, by rotating, or pivoting about a single axis relative to gate opening assembly 120, as explained hereinabove with respect to gate 10. When closing gate 110, the segments are pivoted in the opposing direction, as explained hereinabove.

Figure 6A:
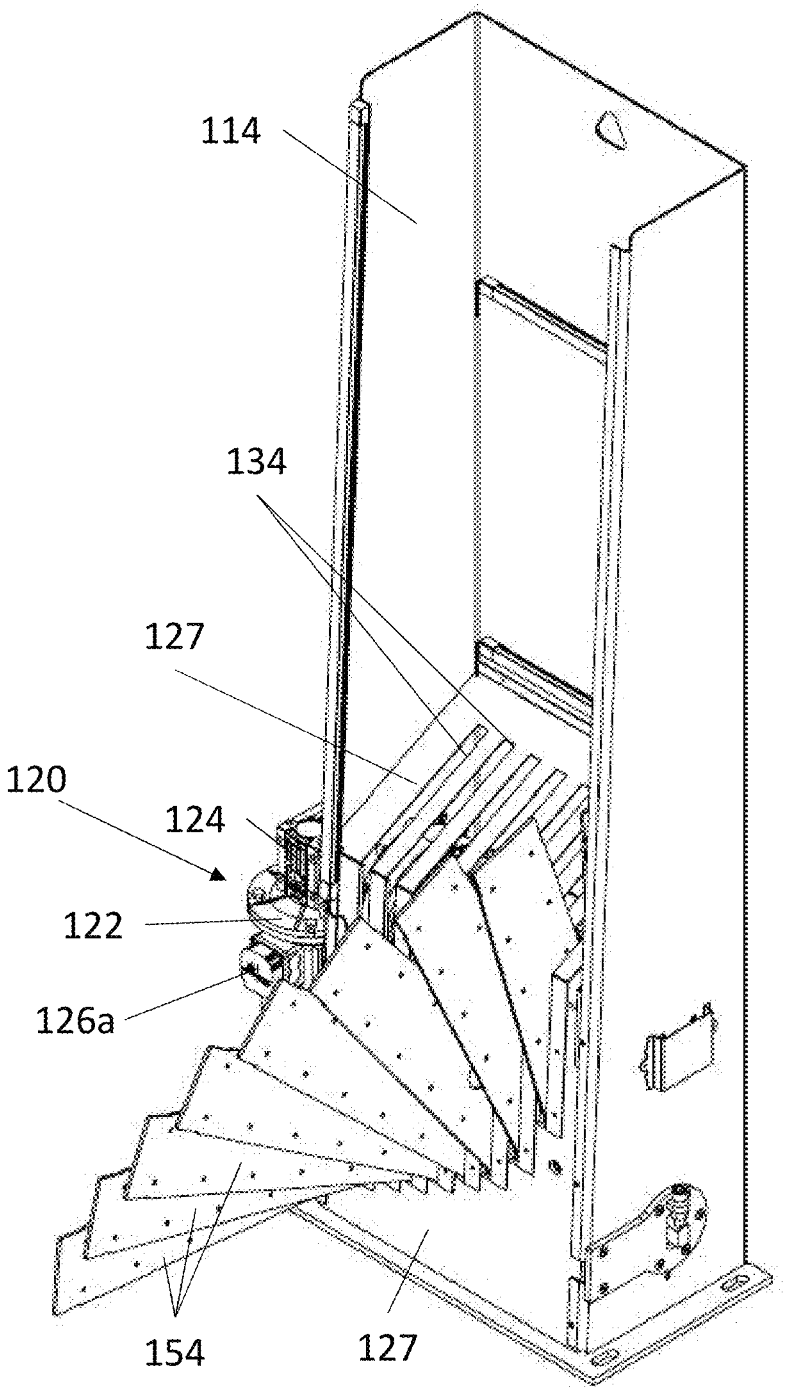
FIGS. 6A, 6B, and 6C are perspective view illustrations of a gate opening assembly forming part of the electric gate of FIGS. 5A to 5C, according to an embodiment of the present invention, where FIG. 6A includes a protective cover.
Figure 6B:
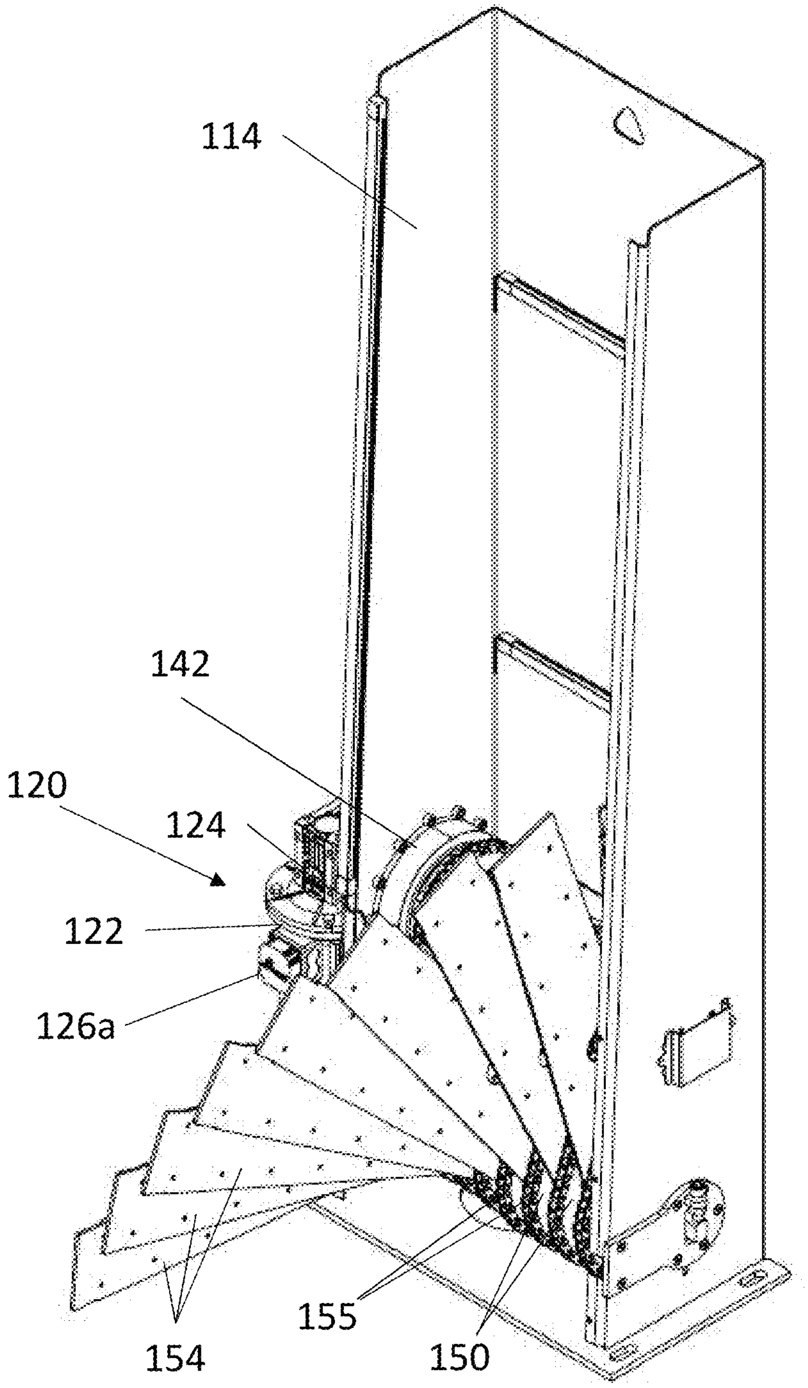
Figure 6C:
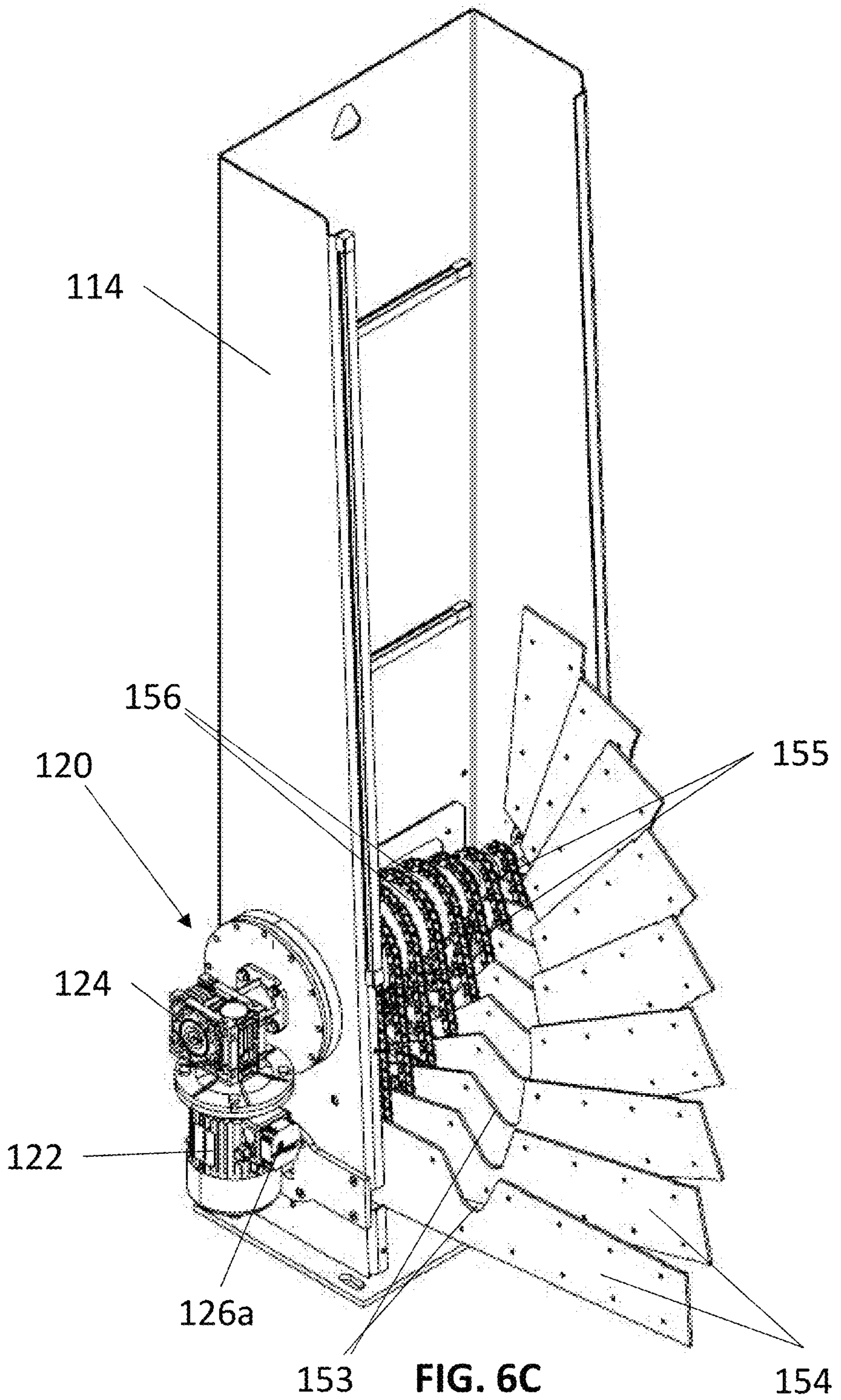
Figure 7A:
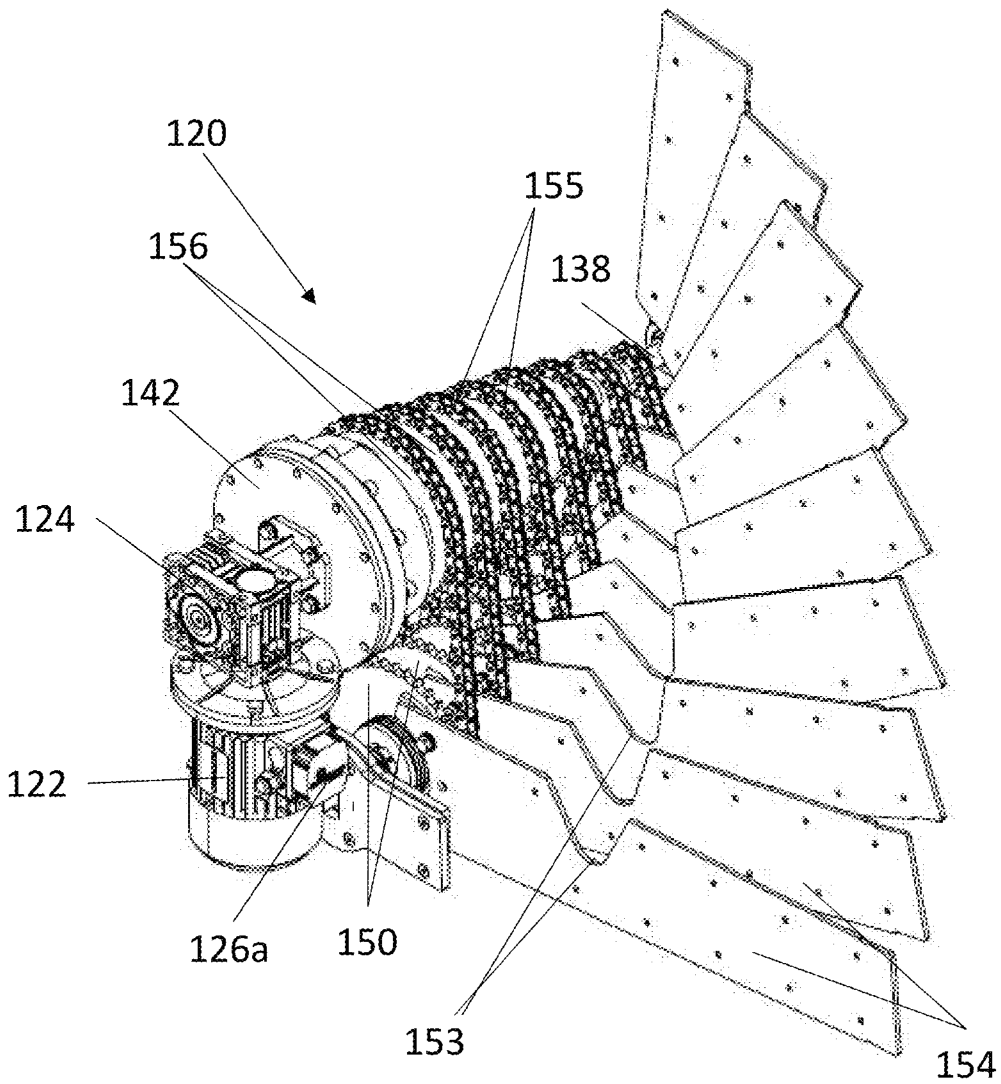
FIGS. 7A, 7B, and 7C are, respectively, first and second perspective illustrations, and a side view planar illustration, of the gate opening assembly of FIGS. 6A to 6C, having a side cover removed therefrom to show an internal mechanism.
Figure 7B:
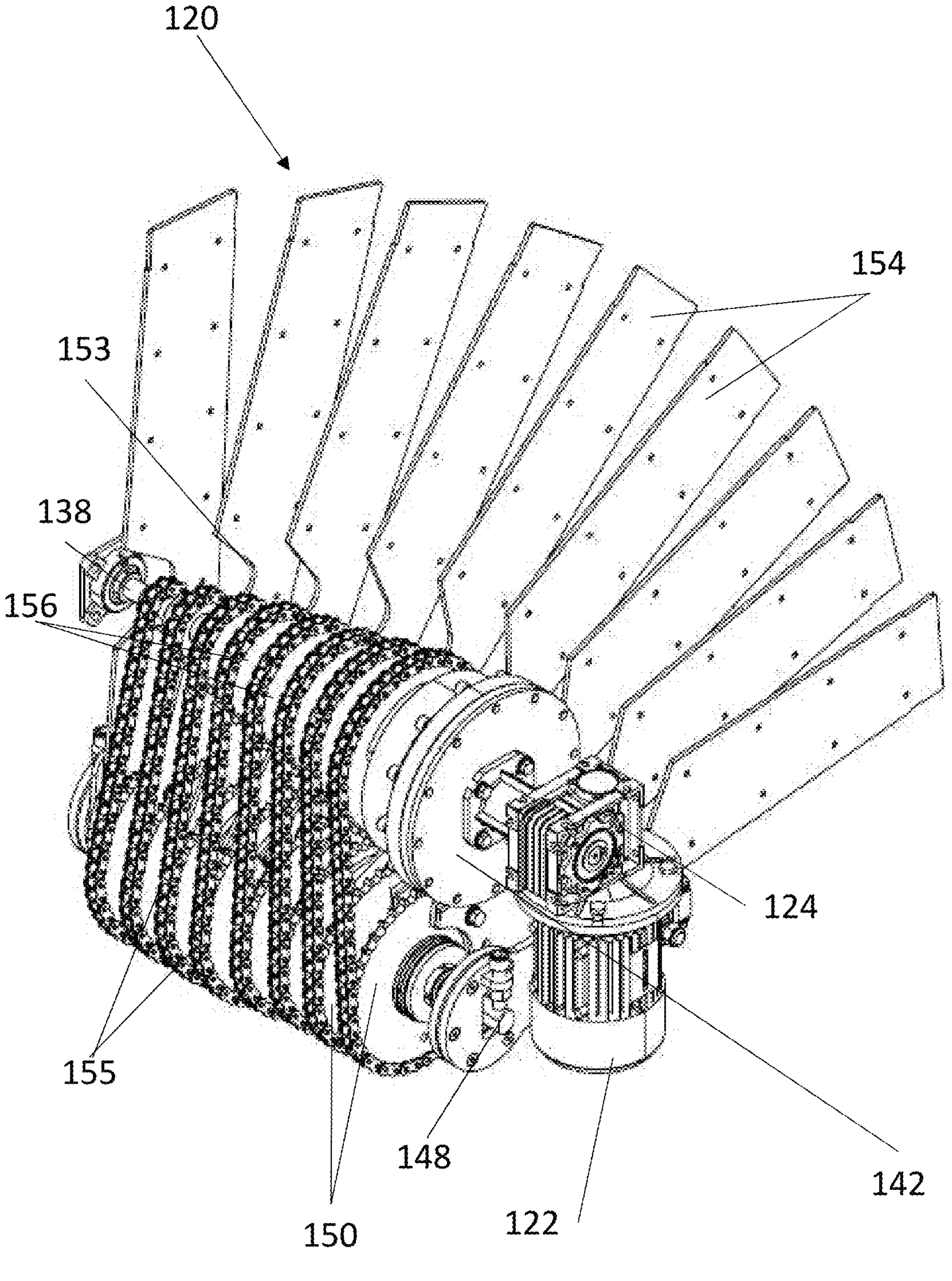
Figure 7C:
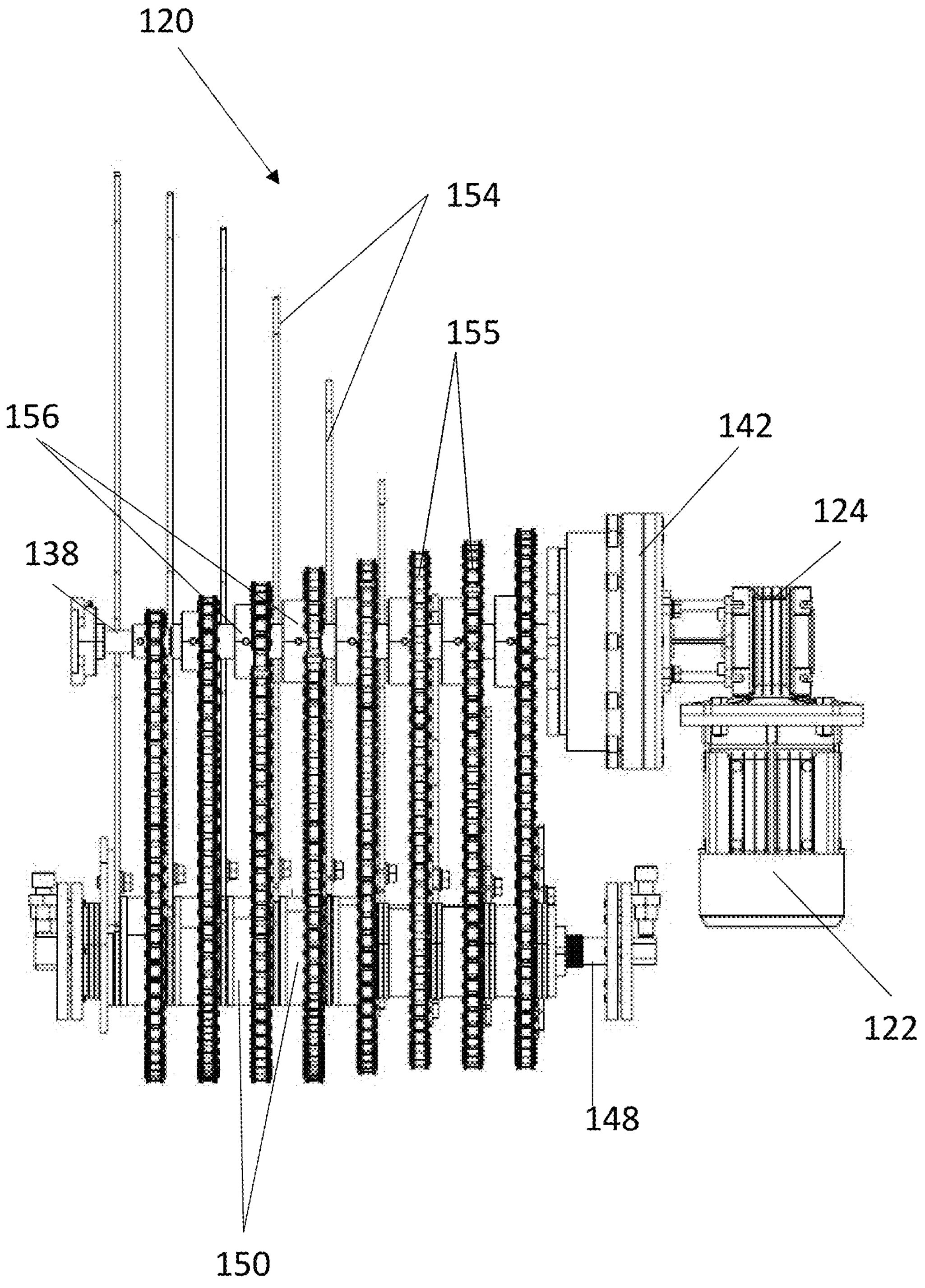

Reference is now made to FIGS. 6A, 6B, and 6C, which are perspective view illustrations of a gate opening assembly 120, where FIG. 6A includes a protective cover, and to FIGS. 7A, 7B, and 7C, which are, respectively, first and second perspective illustrations, and a side view planar illustration, of gate opening assembly 120, having a side cover removed therefrom to show an internal mechanism.

As seen, and as discussed hereinabove with respect to FIGS. 1A to 4, gate opening assembly 120 includes an electric motor 122 connected to a gear reducer, for example an NMRV gearbox 124, which includes a secondary input shaft 126*a* for connection of a manual handle.

Gate opening assembly 120 is adapted to be at least partially disposed within support 114, such that support 114 surrounds portions the gate opening assembly 120 from three sides thereof. As seen in FIG. 6A, a protective cover 127 may be connected to support 114, to enclose assembly 120. Cover 127 may be angled or curved, and typically includes a plurality of slots 134. As shown in FIGS. 6A to 6C, motor 122 and gearbox 124 may be disposed outside of support 114, and mounted to an outside surface thereof.

An output shaft 138 of gearbox 124 rotatably extends through support 114. A second shaft 148 extends through support 114, and is fixed relative to output shaft 138. Typically, second shaft 148 is disposed lower than, and typically parallel to, output shaft 138.

In some embodiments, a secondary gear system 142 may be used in series with gear reducer 124, as described hereinabove with respect to FIGS. 2A to 4. In such embodiments, output shaft 138 provides input to the secondary gear system, and an output shaft of the secondary gear extends through support 114.

As seen, mounted onto second shaft 148 are a plurality of sprockets 150, which are rotatable relative to second shaft 148. In some embodiments, sprockets 150 may be substantially equally sized, and have the same number of teeth. In other embodiments, such as the illustrated embodiment, the sprockets may be in gradually reducing size, with the largest sprockets 150 being closer to gearbox 124, and the smallest being further away from gearbox 124. In some embodiments, bearings may be disposed between each of sprockets 150 and second shaft 148. Each of sprockets 150 has mounted thereon a corresponding engagement arm, or lever, 154. Each of the engagement arms extends through a corresponding one of slots 134, as seen clearly in FIG. 6A, and is adapted to have mounted thereon a corresponding one of gate segments 116. In some embodiments, each engagement arm 154 includes an indentation 153, adapted to fit around output shaft 138 and gears mounted thereon, to facilitate a more compact arrangement of the arms 154 and gate segments mounted thereon when the gate is open.

A second plurality of sprockets 156 are mounted onto output shaft 138 of gearbox 124, and are rotatable therewith. Sprockets 156 each have a different diameter and a correspondingly different number of teeth. Each of sprockets 156, is associated with a corresponding one of sprockets 150 by a transmission chain 155 to form a segment moving assembly, as described hereinabove.

As described hereinabove, in use, when motor 122 is operated, for example by a remote control, rotation of the motor is reduced by gear reducer 124 (and by the secondary gear system, when present), such that output shaft 138 rotates slowly. Sprockets 156 all rotate together with the output shaft, and to the same degree, while causing different lengths of rotation of sprockets 150, due to the differences in sizes between sprockets 156 and sprockets 150. Thus, each of sprockets 150 will rotate to a different extent, with the rotations all being simultaneous and based on the rotation of output shaft 138.

The simultaneous differential rotation of sprockets 150 results in simultaneous differential rotation of the arms 154, and in corresponding simultaneous differential rotation of gate segments 116. The reduction of the rotation of motor 122, as well as the number of teeth of each of sprockets 156 and of sprockets 150 are computed based on the angular distance each of the gate segments 116 must traverse in order to fully open the gate.

In some embodiments, each of the gate segments may be actively moved by the motor 122. In such embodiment, gate opening assembly 120 would include a segment-opening subassembly associated with each of the gate segments.

As discussed hereinabove, in some embodiments, a manually rotatable handle 126 may be connected to secondary input shaft 126*a* of NMRV gearbox 124, to manually operate the gearbox and the gate.

In some embodiments, gate 110 may further include a safety assembly, adapted to stop operation of motor 122 when any of gate segments 116 is stuck or engages another object, substantially as described hereinabove.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. Similarly, the content of a claim depending from one or more particular claims may generally depend from the other, unspecified claims, or be combined with the content thereof, absent any specific, manifest incompatibility therebetween.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An assembly for mobilizing a plurality of gate segments, the assembly comprising;

an electric motor;

at least one gear reducer functionally connected to said electric motor, said at least one gear reducer having an output shaft and an input shaft;

a manually rotatable handle, connected or connectable to the input shaft of the at least one gear reducer;

an assembly housing including front and back surfaces, wherein said output shaft of said at least one gear reducer extends between the front and back surfaces of the assembly housing; and an axle extending between said front and back surfaces of said assembly housing, substantially parallel to said output shaft of said at least one gear reducer; and a plurality of segment-moving subassemblies, functionally associated with said output shaft of said at least one gear reducer, each of said plurality of segment-moving subassemblies including:

a first sprocket, functionally associated with said output shaft of said at least one gear reducer and rotatable therewith;

a second sprocket, mounted onto said axle and rotatable relative to said axle;

a transmission chain connecting said first sprocket and said second sprocket; and an engagement arm, mounted onto said second sprocket and adapted to have a corresponding gate segment mounted thereon, wherein rotation of said output shaft causes rotation of said first sprocket, which in turn drives rotation of said second sprocket, said engagement arm, and said corresponding gate segment, wherein each of said segment-moving subassemblies is adapted to control motion of the corresponding gate segment, wherein each of said plurality of segment-moving subassemblies having a closed operative orientation and an open operative orientation, said closed operative orientation and said open operative orientation being in a single plane and being rotationally offset from one another, wherein during operation thereof, said electric motor causes simultaneous rotational motion of all of the plurality of segment-moving subassemblies, to transition each segment-moving subassembly of the plurality of segment-moving subassemblies between the closed operative orientation and the open operative orientation, and wherein, when said manually rotatable handle is connected to said input shaft of said gear reducer, rotation of said manually rotatable handle causes said simultaneous rotational motion of all of the plurality of segment-moving subassemblies, to transition each segment-moving subassembly of the plurality of segment-moving subassemblies between the closed operative orientation and the open operative orientation.

2. The assembly of claim 1, wherein said at least one gear reducer comprises a first gear reducer having said output shaft and a second gear reducer functionally connected to said output shaft of said first gear reducer, said second gear reducer having a second output shaft, wherein said plurality of segment-moving subassemblies are connected to said second output shaft and are functionally associated with said output shaft of said first gear reducer via said second gear reducer.

3. The assembly of claim 2, wherein said second gear reducer comprises a planetary gear system.

4. The assembly of claim 1, wherein:

a first engagement arm of a first segment-moving subassembly of said plurality of segment-moving subassemblies, is adapted to rotate to a first angular extent by rotation of the output shaft of said at least one gear reducer at a given angular extent;

a second engagement arm of a second segment-moving subassembly of said plurality of segment-moving subassemblies, is adapted to rotate to a second angular extent by rotation of the output shaft of said at least one gear reducer at the given angular extent;

wherein said first angular extent is different from said second angular extent; and wherein said first sprocket included in said first segment-moving subassembly has a different number of teeth or a different diameter than said first sprocket included in said second segment-moving subassembly.

5. The assembly of claim 4, wherein said first angular extent is greater than said second angular extent and said first sprocket included in said first segment-moving subassembly has a greater number of teeth or a greater diameter than said first sprocket included in said second segment-moving subassembly.

6. A kit for constructing an electric gate adapted to close an open space, the kit comprising:

the assembly of claim 1; and a plurality of gate segments, each adapted for mounting onto a corresponding one of the plurality of segment-moving subassemblies, such that, when the plurality of gate segments are mounted onto the plurality of segment-moving subassemblies and the plurality of segment-moving subassemblies are in the closed operative orientation, said plurality of gate segments are configured to cover the open space.

7. The kit of claim 6, further comprising a support adapted to be placed at an edge of said open space, said support adapted to have the assembly attached thereto.

8. The kit of claim 6, wherein each gate segment of said plurality of gate segments has an angular construction, extending from a base angle adapted to be disposed adjacent said assembly.

9. The kit of claim 6, further comprising a counter support adapted to be disposed at a second edge of said open space, said counter support including a plurality of support brackets, wherein, when said plurality of gate segments are mounted onto said plurality of segment-moving assemblies and said plurality of segment-moving assemblies are in said closed operative orientation, ends of at least some of said plurality of gate segments, distal to said support, are adapted to engage corresponding ones of said plurality of support brackets.

10. The kit of claim 6, wherein at least some of said plurality of gate segments have mounted thereon segment-engaging brackets, and wherein, when said plurality of gate segments are mounted onto said plurality of segment-moving assemblies and said plurality of segment-moving assemblies are in said closed operative orientation, a segment-engaging bracket of a specific one of said plurality of gate segments is adapted to engage another gate segment adjacent to said specific one of said plurality of said gate segments.

11. The assembly of claim 1, wherein each of said segment-moving subassemblies is disposed within said assembly housing, such that:

said first sprockets of said plurality of segment-moving subassemblies are disposed in parallel to each other along said output shaft of said at least gear reducer, between said front and back surfaces of said housing subassembly;

said second sprockets of said plurality of segment-moving subassemblies are disposed in parallel to each other along said axle, between said front and back surfaces of said housing subassembly.

12. The assembly of claim 11, wherein said assembly housing further includes a side surface including a plurality of slots, and wherein each of said engagement arms of said plurality of said segment-moving subassemblies extends out of said assembly housing via a corresponding one of said plurality of slots.

* * * * *